United States Patent [19]
Lehmann et al.

[11] Patent Number: 5,944,855
[45] Date of Patent: Aug. 31, 1999

[54] PROCESS FOR DICHROMATIC OR TRICHROMATIC DYEING OR PRINTING

[75] Inventors: Urs Lehmann, Basle; Marcel Frick, Reinach, both of Switzerland; Klaus Hannemann, Lörrach, Germany

[73] Assignee: Ciba Specialty Chemicals Corporation, Tarrytown, N.Y.

[21] Appl. No.: 09/075,003

[22] Filed: May 8, 1998

Related U.S. Application Data

[62] Division of application No. 08/752,299, Nov. 19, 1996, Pat. No. 5,779,740.

[30] Foreign Application Priority Data

Nov. 23, 1995 [CH] Switzerland ............... 3315/95

[51] Int. Cl.$^6$ ............... D06P 3/10; D06P 1/382; D06P 1/384
[52] U.S. Cl. ............... 8/549; 8/641; 8/917; 8/924
[58] Field of Search ............... 8/549, 641, 917, 8/924

[56] References Cited

U.S. PATENT DOCUMENTS

| | | | |
|---|---|---|---|
| 4,191,687 | 3/1980 | Austin ............... | 260/153 |
| 4,378,313 | 3/1983 | Kayane et al. ............... | 260/153 |
| 4,442,288 | 4/1984 | Meininger et al. ............... | 544/189 |
| 4,652,269 | 3/1987 | Bowles et al. ............... | 8/641 |
| 4,754,023 | 6/1988 | Tzikas et al. ............... | 534/618 |
| 4,786,721 | 11/1988 | Tzikas et al. ............... | 534/617 |
| 4,801,694 | 1/1989 | Scheibli et al. ............... | 534/637 |
| 4,851,011 | 7/1989 | Lacroix et al. ............... | 8/527 |
| 4,876,334 | 10/1989 | Tzikas et al. ............... | 534/632 |
| 5,256,774 | 10/1993 | Harms et al. ............... | 534/612 |
| 5,298,607 | 3/1994 | Seiler ............... | 534/638 |
| 5,420,256 | 5/1995 | Eizenhöfer et al. ............... | 534/618 |
| 5,460,631 | 10/1995 | Hoppe et al. . | |
| 5,541,301 | 7/1996 | Jordine et al. ............... | 534/635 |

FOREIGN PATENT DOCUMENTS

| | | |
|---|---|---|
| 0031099 | 7/1981 | European Pat. Off. . |
| 0056975 | 8/1982 | European Pat. Off. . |
| 0070807 | 1/1983 | European Pat. Off. . |
| 0071985 | 2/1983 | European Pat. Off. . |
| 0074928 | 3/1983 | European Pat. Off. . |
| 0085025 | 8/1983 | European Pat. Off. . |
| 0127456 | 12/1984 | European Pat. Off. . |
| 0657508 | 6/1995 | European Pat. Off. . |
| 0708150 | 4/1996 | European Pat. Off. . |
| 50-157422 | 12/1975 | Japan . |
| 53-46328 | 4/1978 | Japan . |
| 53-46329 | 4/1978 | Japan . |
| 56-118974 | 9/1981 | Japan . |
| 57-49663 | 3/1982 | Japan . |
| 57-199877 | 12/1982 | Japan . |
| 59-174649 | 10/1984 | Japan . |
| 60-47071 | 3/1985 | Japan . |
| 62-164765 | 7/1987 | Japan . |
| 1372527 | 10/1974 | United Kingdom . |
| 1410721 | 10/1975 | United Kingdom . |
| 1576237 | 10/1980 | United Kingdom . |

OTHER PUBLICATIONS

Chem. Abst. 84:123403a of JP–A–50/157,422 Dec. 1925.
Chem. Abst. 89:112372s of JP–A–53/46,328 Apr. 1978.
Chem. Abst. 89:112371r of JP–A–53/46,329 Sep. 1981.
Chem. Abst 96:36799p of JP–A–56/118,974 Sep. 1981.
Chem. Abst. 97:57111u of JP–A–57/49,663 Mar. 1982.
Chem. Abst. 98:217159s of JP–A–57/199,877 Dec. 1982.
Chem. Abst. 102:63580j of JP–A–59/174,649 Oct. 1984.
Chem. Abst. 102:222146r of JP–A–60/47071 Mar. 1985.
Chem. Abst 107:219139p of JP–A–62/164,765 Jul. 1987.

*Primary Examiner*—Margaret Einsmann
*Attorney, Agent, or Firm*—Jacob M. Levine; Kevin T. Mansfield; David R. Crichton

[57] ABSTRACT

Process for dichromatic or trichromatic dyeing or printing of natural or synthetic polyamide fiber material, which comprises using at least one blue-dyeing fiber-reactive anthraquinone dye of the formula

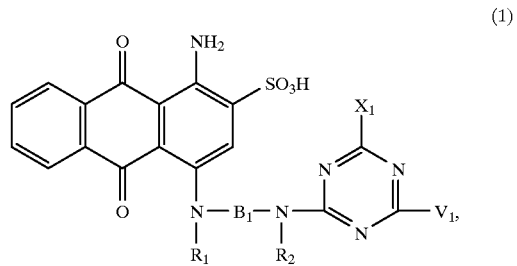

(1)

in which $R_1$ and $R_2$ independently of one another are hydrogen or substituted or unsubstituted $C_1$–$C_{12}$alkyl, $X_1$ is halogen, $B_1$ is an organic bridge member and $V_1$ is an aliphatic or aromatic amine containing a fibre-reactive group, together with at least one fiber-reactive sulfo group containing yellow- or orange-dyeing dye or together with at least one fiber-reactive sulfo group containing red-dyeing dye. Level dyeings with good fastness properties are obtained.

7 Claims, No Drawings

PROCESS FOR DICHROMATIC OR TRICHROMATIC DYEING OR PRINTING

This application is a divisional prior application No. 08/752,299 filed Nov. 19, 1996, now U.S. Pat. No. 5,779,740.

The present invention relates to a process for dichromatic or trichromatic dyeing or printing.

The object on which the present invention is based was to discover a process for dyeing or printing natural or synthetic polyamide fibre materials with dyes which are suitable for combination according to the dichromatic principle, and in particular according to the trichromatic principle.

It has now been found that this object can be achieved according to the invention by the process described below. The dyeings thus obtained achieve the object described. In particular, the resulting dyeings are distinguished by a uniform colour build-up with a simultaneous constancy of shade in various concentrations and good combination properties, and have a good levelness and no dichroism.

The present invention relates to a process for dichromatic or trichromatic dyeing or printing of natural or synthetic polyamide fibre material, which comprises using at least one blue-dyeing, fibre-reactive anthraquinone dye of the formula

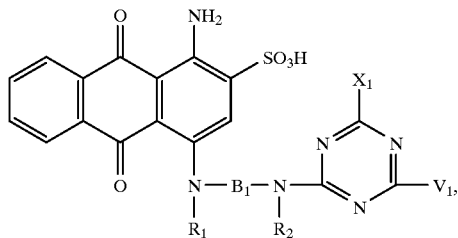

(1)

in which $R_1$ and $R_2$ independently of one another are hydrogen or substituted or unsubstituted $C_1-C_{12}$alkyl, $X_1$ is halogen, $B_1$ is an organic bridge member and $V_1$ is an aliphatic or aromatic amine containing a fibre-reactive group, together with at least one fibre-reactive sulfo group containing yellow- or orange-dyeing dye or together with at least one fibre-reactive sulfo group containing red-dyeing dye.

Preferred processes are corresponding processes for trichromatic dyeing or printing of natural or synthetic polyamide fibre material, wherein at least one blue-dyeing fibre-reactive anthraquinone dye of the formula (1) is used together with at least one fibre-reactive sulfo group containing yellow- or orange-dyeing dye and together with at least one fibre-reactive sulfo group containing red-dyeing dye.

$C_1-C_{12}$alkyl radicals $R_1$ and $R_2$ are preferably $C_1-C_8$alkyl radicals, in particular $C_1-C_4$alkyl radicals, for example methyl, ethyl, propyl, isopropyl, butyl, sec-butyl, tert-butyl or isobutyl. The alkyl radicals mentioned can be unsubstituted or substituted, for example by hydroxyl, sulfo or sulfato. The unsubstituted radicals are preferred here.

Preferably, $R_1$ and $R_2$ independently of one another are hydrogen or $C_1-C_4$alkyl which is unsubstituted or substituted by hydroxyl, sulfo or sulfato, in particular hydrogen or $C_1-C_4$alkyl, and preferably hydrogen.

$X_1$ is preferably fluorine or, in particular, chlorine.

An organic bridge member $B_1$ is, for example, a $C_2-C_{12}$alkylene radical, which can be interrupted by 1, 2 or 3 members from the group consisting of —NH—, —N(CH$_3$)— or —O— and is unsubstituted or substituted by hydroxyl, sulfo, sulfato, cyano or carboxyl, or a $C_5-C_9$cycloalkylene radical, $C_1-C_4$alkylene-$C_5-C_9$cycloalkylene radical or $C_1-C_4$alkylene-$C_5-C_9$cycloalkylene-$C_1-C_4$alkylene radical, which are unsubstituted or substituted by $C_1-C_4$alkyl, $C_1-C_4$alkoxy, sulfo, halogen or carboxyl, or a phenylene radical, $C_1-C_4$alkylene-phenylene radical or $C_1-C_4$alkylene-phenylene-$C_1-C_4$alkylene radical, which are unsubstituted or substituted by $C_1-C_4$alkyl, $C_1-C_4$alkoxy, $C_2-C_4$alkanoylamino, sulfo, halogen or carboxyl. Furthermore, the radical of the formula —N(R$_1$)—B$_1$—N(R$_2$)— can be a radical of the formula

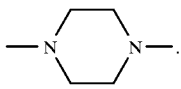

An alkylene radical $B_1$ is preferably a $C_2-C_6$alkylene radical, which can be interrupted by 1, 2 or 3 members —O— and is unsubstituted or substituted by hydroxyl or sulfato. The unsubstituted radcials, in particular the radical of the formula

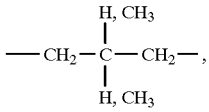

are preferred. The radicals of the formulae —(CH$_2$)$_3$— and —CH$_2$—C(CH$_3$)$_2$—CH$_2$— are of particular interest.

Preferred cycloalkylene-containing radicals $B_1$ are the corresponding cyclohexylene-containing radicals, which, in particular, are unsubstituted or substituted by $C_1-C_4$alkyl. A cyclohexylene radical or methylene-cyclohexylene radical which is unsubstituted or substituted by $C_1-C_4$alkyl, in particular a methylene-cyclohexylene radical which is unsubstituted or substituted by $C_1-C_4$alkyl, is particularly preferred here.

Preferred phenylene-containing radicals $B_1$ are the corresponding radicals which are unsubstituted or substituted by $C_1-C_4$alkyl, $C_1-C_4$alkoxy, halogen or sulfo. Phenylene or methylene-phenylene-methylene which are unsubstituted or substituted by $C_1-C_4$alkyl, $C_1-C_4$alkoxy, halogen or sulfo are particularly preferred. Especially preferred radicals are those of the formula

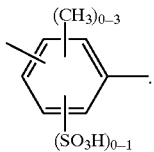

$B_1$ is preferably a $C_2-C_6$alkylene radical, which can be interrupted by 1, 2 or 3 members —O—and is unsubstituted or substituted by hydroxyl or sulfato, or a cyclohexylene radical or methylene-cyclohexylene radical which is unsubstituted or substituted by $C_1-C_4$alkyl, or a phenylene or methylene-phenylene-methylene radical which is unsubstituted or substituted by $C_1-C_4$alkyl, $C_1-C_4$alkoxy, halogen or sulfo.

$B_1$ is particularly preferably a $C_2-C_6$alkylene radical, a methylene-cyclohexylene radical which is unsubstituted or substituted by $C_1-C_4$alkyl, or a phenylene or methylene-phenylene-methylene radical which is unsubstituted or substituted by $C_1-C_4$alkyl, $C_1-C_4$alkoxy, halogen or sulfo.

$B_1$ is especially preferably

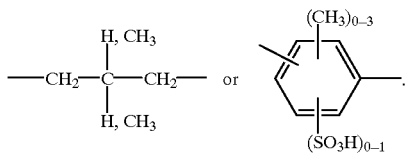

$V_1$ is preferably a radical of the formula

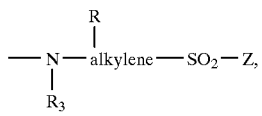 (2a)

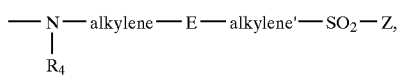 (2b)

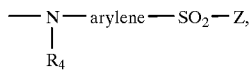 (2c)

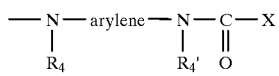 (2d)

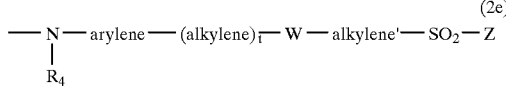 (2e)

or

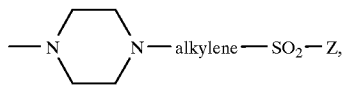 (2f)

in which

W is a group of the formula $-SO_2-NR_3-$, $-CONR_3-$ or $-NR_3CO-$, $R_3$ is hydrogen, $C_1-C_4$alkyl which is unsubstituted or substituted by hydroxyl, sulfo, sulfato, carboxyl or cyano, or a radical of the formulae

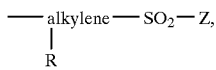

R is hydrogen, hydroxyl, sulfo, sulfato, carboxyl, cyano, halogen, $C_1-C_4$alkoxycarbonyl, $C_1-C_4$alkanoyloxy, carbamoyl or the group $-SO_2-Z$, Z is the radical $-CH=CH_2$ or $-CH_2-CH_2-Y$ and Y is a leaving group, X is the radical

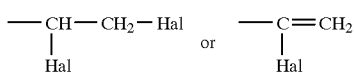

and Hal is halogen, E is the radical $-O-$ or $-NR_5-$ and $R_5$ is hydrogen or $C_1-C_4$alkyl, alkylene and alkylene' independently of one another are $C_1-C_6$alkylene, arylene is a phenylene or naphthylene radical which is unsubstituted or substituted by sulfo, carboxyl, $C_1-C_4$alkyl, $C_1-C_4$alkoxy or halogen, $R_4$ and $R_4'$ independently of one another are hydrogen or $C_1-C_4$alkyl which is unsubstituted or substituted by carboxyl, cyano, hydroxyl, sulfo or sulfato and t is the number 0 or 1.

Alkylene and alkylene' independently of one another are, for example, a methylene, ethylene, 1,3-propylene, 1,4-butylene, 1,5-pentylene or 1,6-hexylene radical or branched isomers thereof.

Preferably, alkylene and alkyene' are a $C_1-C_4$alkylene radical, preferably a radical of the formula $-(CH_2)_{2-3}-$ and particularly preferably an ethylene radical.

R is preferably hydrogen or the group $-SO_2-Z$, where Z is as defined and preferred above. R is particularly preferably hydrogen.

$R_3$ is preferably hydrogen, $C_1-C_4$alkyl or a group -alkylene-$SO_2$-Z, in which alkylene and Z are each as defined above. $R_3$ is particularly preferably hydrogen or $C_1-C_4$alkyl, in particular hydrogen.

$R_4$ and $R_4'$ are preferably hydrogen or a $C_1-C_4$alkyl radical, and particularly preferably hydrogen.

$R_5$ is preferably hydrogen

Arylene is is preferably a phenylene radical, which is unsubstituted or substituted, for example by sulfo, $C_1-C_4$alkyl, $C_1-C_4$alkoxy or halogen, in particular by sulfo. Arylene is preferably a 1,3- or 1,4-phenylene radical, which is unsubstituted or substituted, for example by sulfo, methyl or methoxy, in particular by sulfo.

E is preferably $-NH-$, and particularly preferably $-O-$.

W is preferably a group of the formula $-NHCO-$or, in particular, $-CONH-$.

Hal is preferably chlorine or, in particular, bromine.

The leaving group Y is, for example, $-Cl$, $-Br$, $-F$, $-OSO_3H$, $-SSO_3H$, $-OCO-CH_3$, $-OPO_3H_2$, $-OCO-C_6H_5$, $-OSO_2-C_1-C_4$alkyl or $-OSO_2-N(C_1-C_4$alkyl$)_2$. Y is preferably a group of the formula $-Cl$, $-OSO_3H$, $-SSO_3H$, $-OCO-CH_3$, $-OCO-C_6H_5$ or $-OPO_3H_2$, in particular $-Cl$, $-OSO_3H$ or $-OCO-CH_3$ and particularly preferably $-Cl$ or $-OSO_3H$. Y is especially preferably a group of the formula $-OSO_3H$.

t is preferably the number 0.

Preferred radicals $V_1$ are those in which W is a group of the formula $-CONH-$, R, $R_3$, $R_4$ and $R_4'$ are hydrogen, Y is $-Cl$, $-OSO_3H$ or $-OCO-CH_3$, in particular $-Cl$ or $-OSO_3H$, Hal is chlorine or, in particular, bromine, E is the radical $-O-$, arylene is a phenylene radical which is unsubstituted or substituted by sulfo, carboxyl, $C_1-C_4$alkyl, $C_1-C_4$alkoxy or halogen, preferably by sulfo, and t is the number 0.

As the radical $V_1$ of the formula (2a), those of the formula $$-NH-(CH_2)_{2-3}-SO_2Z \qquad (3a),$$

as the radical $V_1$ of the formula (2b), those of the formula $$-NH-(CH_2)_{2-3}-O-(CH_2)_{2-3}-SO_2Z \qquad (3b),$$

as the radical $V_1$ of the formula (2c), those of the formula

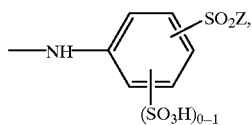

(3c)

as the radical $V_1$ of the formula (2d), those of the formula

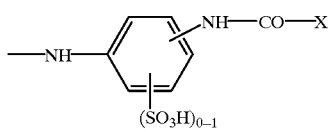

(3d)

and as the radical $V_1$ of the formula (2e), those of the formula

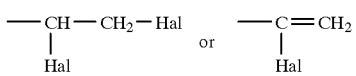

(3e)

are preferred, where the radicals X and Z are as defined and preferred above.

$V_1$ is particularly preferably a radical of the formulae (2a) to (2e), in particular a radical of the formulae (3a) to (3e).

$V_1$ is especially preferably a radical of the formulae (2a), (2b), (2d) or (2e), in particular a radical of the formulae (3a), (3b), (3d) or (3e).

Particularly important radicals $V_1$ are those of the formulae (2b) and (2d), in particular those of the formuale (3b) and (3d).

Especially important radicals $V_1$ are those of the formula (2d), in particular those of the formula (3d).

The blue-dyeing fibre-reactive anthraquinone dye of the formula (1) used is preferably an anthraquinone dye of the formula

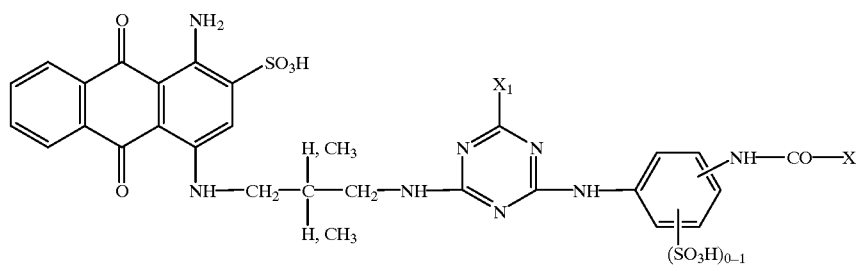

(4)

or

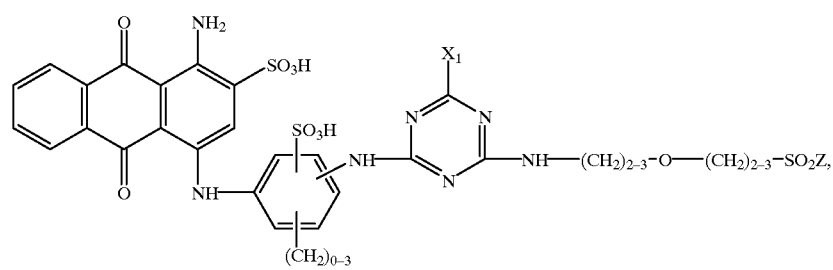

(5)

in which $X_1$, X and Z are as defined and preferred above. Preferably, $X_1$ is fluorine or, in particular, chlorine, X is the radical $$-\underset{Hal}{\overset{}{CH}}-CH_2-Hal \quad \text{or} \quad -\underset{Hal}{\overset{}{C}}=CH_2$$

and Hal is chlorine or, in particular, bromine, and Z is the radical $-CH=CH_2$ or $-CH_2-CH_2-Y$ and Y is $-OCO-CH_3$ or, in particular, $-Cl$ or $-OSO_3H$. Anthraquinone dyes of the formula (4) are particularly preferred here.

Fiber-reactive yellow- or orange-dyeing dyes containing sulfo groups and fibre-reactive red-dyeing dyes containing sulfo groups are, in particular, mono- or disazo dyes. These dyes preferably contain 1 to 3 sulfo groups, in particular 1 or 2 sulfo groups.

Preferred dyes are mono- or disazo dyes of the formula $$D_1-N=N-(M-N=N)_u-K$$

In this formula, $D_1$ is the radical of a diazo component of the benzene or naphthalene series, M is the radical of a middle component of the benzene or napthalene series, K is the radical of a coupling component of the benzene, naphthalene, pyrazole or 6-hydroxypyrid-2-one series and u is the number 0 or 1, it being possible for $D_1$, M and K to carry the substituents customary in azo dyes, in addition to fibre-reactive groups, u is preferably the number 0.

Examples of such substituents are, in addition to the fibre-reactive groups:

alkyl groups having 1 to 4 carbon atoms, such as methyl, ethyl, propyl, isopropyl or butyl; alkoxy groups having 1 to 4 carbon atoms, such as methoxy, ethoxy, propoxy, isopropoxy or butoxy; alkanoylamino groups having 2 to 4 carbon atoms, in particular acetylamino or propionylamino; amino; N-mono- or N,N-di-$C_1$–$C_4$alkylamino; trifluoromethyl; nitro; cyano; halogen, such as fluorine, bromine or, in particular, chlorine; carbamoyl; ureido; hydroxyl; carboxyl; sulfomethyl; sulfo; sulfamoyl; N-mono- or N,N-dialkylsulfamoyl having in each case 1 to 4 carbon atoms; and phenyl, phenylamino, phenylsulfonyl, benzoylamino or phenylcarbonylamino which are unsubstituted or further substituted in the phenyl ring by $C_1$–$C_4$alkyl, $C_1$–$C_4$alkoxy, $C_2$–$C_4$alkanoylamino, ureido, halogen, carboxyl or sulfo.

Fiber-reactive groups for the fibre-reactive yellow- or orange-dyeing dyes containing sulfo groups and the fibre-reactive red-dyeing dyes containing sulfo groups are, for example, the following:

  (6a)

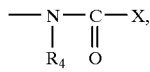  (6b)

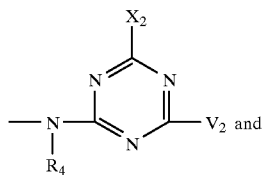  (7a)

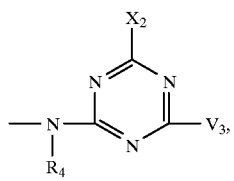  (7b)

in which $R_4$ and Z are as defined and preferred above, $V_2$ is as defined and preferred above for $V_1$, $X_2$ is fluorine or, in particular, chlorine and $V_3$ is a non-reactive substituent.

$V_2$ is preferably a radical of the formula (2b), (2c), (2d) or (2e), in particular a radical of the formula (2c), (2d) or (2e), and preferably a radical of the formula (2c) or (2d). $V_2$ is especially preferably a radical of the formula (2d).

$V_3$ is, for example, a hydroxyl, $C_1$–$C_4$alkoxy, $C_1$–$C_4$alkylthio, amino, N-$C_1$–$C_4$alkylamino or N,N-di-$C_1$–$C_4$alkylamino, where the alkyl is unsubstituted or substituted, for example by sulfo, sulfato, hydroxyl, carboxyl or phenyl, cyclohexylamino-, morpholino-, or N-$C_1$–$C_4$alkyl-N-phenylamino or phenylamino or naphthylamino radical, where the phenyl or naphthyl is unsubstituted or substituted, for example by $C_1$–$C_4$alkyl, $C_1$–$C_4$alkoxy, carboxyl, sulfo or halogen.

$V_3$ is preferably amino, N—$C_1$–$C_4$ alkylamino, which is unsubstituted in the alkyl part or substituted by hydroxyl, sulfato or sulfo, morpholino, phenylamino or N-$C_1$–$C_4$-alkyl-N-phenylamino, in which the phenyl is in each case unsubstituted or substituted by sulfo, carboxyl, methyl or methoxy. Particularly preferred definitions are phenylamino or, in particular, N-$C_1$–$C_4$alkyl-N-phenylamino, in which the phenyl is in each case unsubstituted or substituted by sulfo, carboxyl, methyl or methoxy.

Particularly preferred fibre-reactive groups are those of the formulae (6a), (6b) and (7a), in particular those of the formulae (6b) and (7a), and preferably those of the formula (7a). The fibre-reactive groups mentioned are as defined and preferred above.

The fibre-reactive yellow- or orange-dyeing dye containing sulfo groups used in the process according to the invention is preferably at least one of the dyes of the formulae

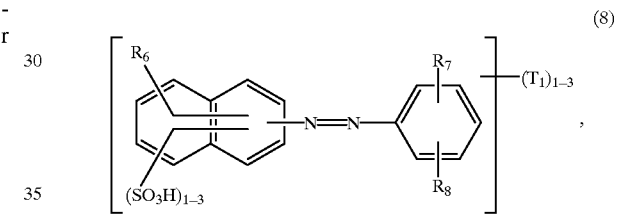 (8)

in which $R_6$ is hydrogen, $C_1$–$C_4$alkyl, $C_1$–$C_4$alkoxy, $C_2$–$C_4$alkanoylamino, amino, N-mono- or N,N-di-$C_1$–$C_4$alkylamino, ureido, halogen, hydroxyl or carboxyl, $R_7$ and $R_8$ independently of one another are hydrogen, $C_1$–$C_4$alkyl, $C_1$–$C_4$alkoxy, $C_2$–$C_4$alkanoylamino, ureido, sulfamoyl, halogen, sulfo or carboxyl and $(T_1)_{1-3}$ is 1 to 3 identical or different fibre-reactive groups,

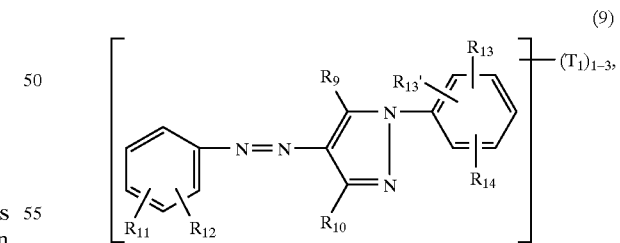 (9)

in which $R_9$ is hydroxyl or amino, $R_{10}$ is methyl or carboxyl, $R_{11}$, $R_{12}$, $R_{13}$, $R_{13}'$ and $R_{14}$ are as defined above for $R_7$ and $R_8$ and $R_{13}'$ can additionally be β-hydroxyethylsulfonyl or a radical of the formula —$SO_2Z$, and in which Z is the radical —CH=$CH_2$ or —$CH_2$—$CH_2$—Y and Y is a leaving group, $(T_1)_{1-3}$ is 1 to 3 identical or different fibre-reactive groups and in which the dye of the formula (9) contains at least one sulfo group,

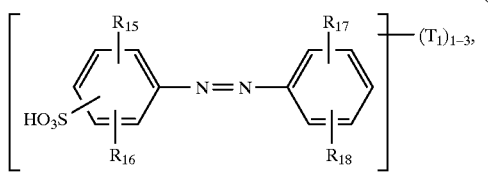
(10)

in which $R_{15}$, $R_{16}$, $R_{17}$ and $R_{18}$ are as defined above for $R_7$ and $R_8$ and $(T_1)_{1-3}$ is 1 to 3 identical or different fibre-reactive groups, and

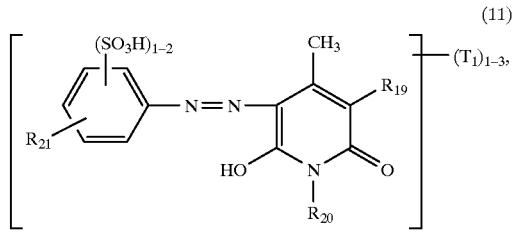
(11)

in which R·is sulfomethyl, carbamoyl or cyano, $R_{20}$ is $C_1$–$C_4$alkyl, $R_{21}$ is as defined above for $R_7$ and $R_8$ and $(T_1)_{1-3}$ is 1 to 3 identical or different fibre-reactive groups.

The fibre-reactive red-dyeing dye containing sulfo groups used in the process according to the invention is preferably at least one dye of the formulae

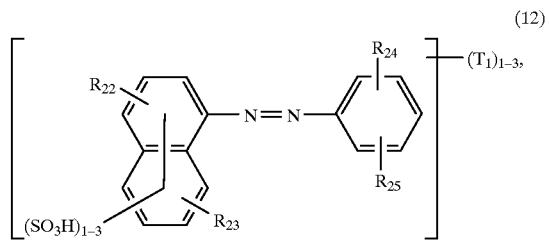
(12)

in which $R_{22}$ is hydrogen, amino or N-mono- or N-N-di-$C_1$–$C_4$alkylamino, $R_{23}$ is hydrogen or hydroxyl, $R_{24}$ and $R_{25}$ independently of one another are as defined above for $R_7$ and $R_8$ or are phenylsulfonyl which is unsubstituted or substituted by $C_1$–$C_4$alkyl, $C_1$–$C_4$alkoxy, $C_2$–$C_4$alkanoylamino, ureido, halogen, carboxyl or sulfo and $(T_1)_{1-3}$ is 1 to 3 identical or different fibre-reactive groups, and

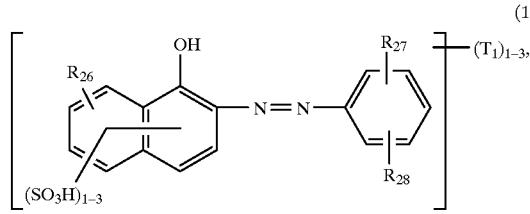
(13)

in which $R_{26}$ is hydrogen, $C_1$–$C_4$alkyl, $C_1$–$C_4$alkoxy, $C_2$–$C_4$alkanoylamino, amino, N-mono- or N,N-di-$C_1$–$C_4$alkylamino, ureido, halogen, carboxyl or phenylcarbonylamino, which is unsubstituted or further substituted in the phenyl ring by $C_1$–$C_4$alkyl, $C_1$–$C_4$alkoxy, $C_2$–$C_4$alkanoylamino, ureido, halogen, carboxyl or sulfo, $R_{27}$ and $R_{28}$ are as defined above for $R_7$ and $R_8$ and $(T_1)_{1-3}$ is 1 to 3 identical or different fibre-reactive groups.

$T_1$ is preferably a fibre-reactive group of the formula (6a), (6b), (7a) or (7b), which are as defined and preferred above. The dyes of the formulae (8) to (13) preferably each contain one or two radicals $T_1$, in particular only one radical $T_1$.

Dyes of the formula (8) are, in particular, those which contain only one or two, preferably two, sulfo groups in the naphthyl radical. $R_6$ is preferably hydrogen, $C_1$–$C_4$alkyl, $C_1$–$C_4$alkoxy or halogen, in particular hydrogen. $R_7$ is preferably hydrogen, $C_1$–$C_4$alkyl, $C_1$–$C_4$alkoxy, $C_2$–$C_4$alkanoylamino, ureido, halogen or sulfo, in particular hydrogen, $C_1$–$C_4$alkyl, $C_1$–$C_4$alkoxy, $C_2$–$C_4$alkanoylamino, ureido or halogen. $R_8$ is preferably hydrogen. Preferably, the dyes of the formula (8) contain only two sulfo groups in total.

Particularly preferred dyes of the formula (8) are those of the formula

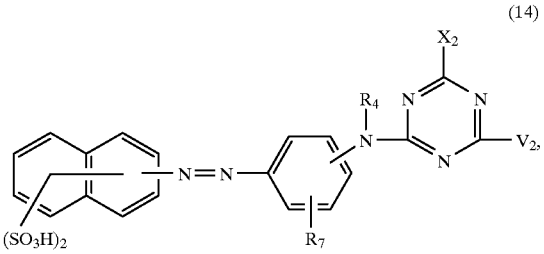
(14)

in which $R_7$, $R_4$, $X_2$ and $V_2$ are as defined and preferred above.

Especially preferred dyes of the formula (8) are those of the formulae

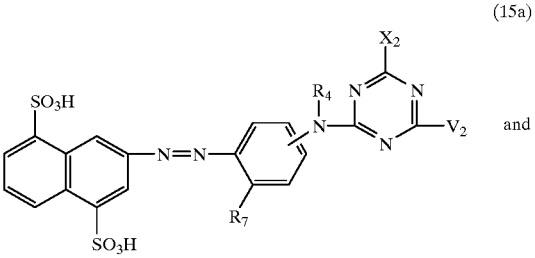
(15a)

and

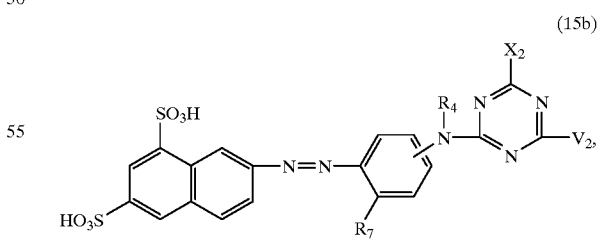
(15b)

in which $R_7$, $R_4$, $X_2$ and $V_2$ are as defined and preferred above.

Dyes of the formula (8) which are of interest are furthermore those of the formula

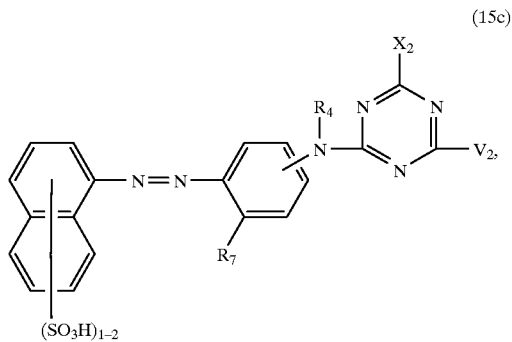

in which $R_7$, $R_4$, $X_2$ and $V_2$ are as defined and preferred above. Preferably, the dye of the formula (15c) contains only one sulfo group in the naphthyl ring drawn in.

Dyes of the formula (9) are, in particular, those in which $R_{10}$ is methyl. $R_{11}$ is preferably sulfo. $R_{13}'$ is preferably hydrogen, halogen or sulfo, in particular hydrogen. Preferably, the dyes of the formula (9) contain only one or two sulfo groups in total.

Particularly preferred dyes of the formula (9) are those of the formula

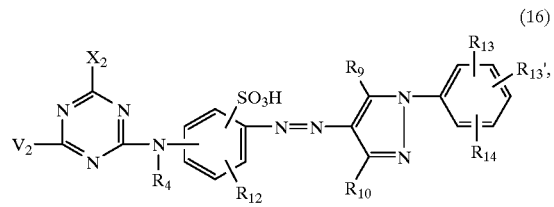

in which $R_4$, $R_9$, $R_{10}$, $R_{12}$, $R_{13}$, $R_{13}'$, $R_{14}$, $X_2$ and $V_2$ are as defined and preferred above. Preferably, $R_3'$ is hydrogen, $C_1$–$C_4$alkyl, $C_1$–$C_4$alkoxy, $C_2$–$C_4$alkanoylamino, ureido, sulfamoyl, halogen, sulfo or carboxyl. $R_{12}$, $R_{13}$, $R_{13}'$ and $R_{14}$ are, in particular, hydrogen, halogen or sulfo, in particular hydrogen.

Especially preferred dyes of the formula (9) are those of the formula

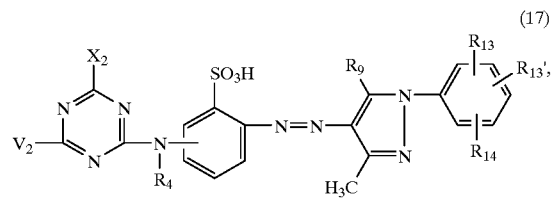

in which $R_4$, $R_9$, $R_{13}$, $R_{13}'$, $R_{14}$, $X_2$ and $V_2$ are as defined and preferred above.

Interesting dyes of the formula (9) are furthermore those of the formula

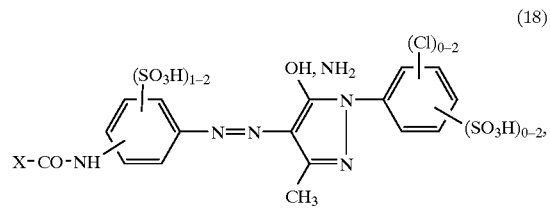

in which X is as defined and preferred above.

Dyes of the formula (10) are, in particular, those in which $R_{15}$, $R_{16}$, $R_{17}$ and $R_{18}$ independently of one another are hydrogen, $C_1$–$C_4$alkyl, $C_1$–$C_4$alkoxy, $C_2$–$C_4$alkanoylamino, halogen or ureido. $R_{15}$, $R_{16}$ and $R_{17}$ are preferably hydrogen. $R_{18}$ is preferably $C_2$–$C_4$alkanoylamino. Preferably, the dyes of the formula (10) contain only one or two sulfo groups in total.

Dyes of the formula (11) are, in particular, those in which $R_{19}$ is carbamoyl. $R_{20}$ is preferably ethyl. Preferably, the dyes of the formula (11) contain only two sulfo groups in total.

Dyes of the formula (12) are, in particular, those in which $R_{22}$ is amino or N-mono- or N,N-di-$C_1$–$C_4$alkylamino. $R_{23}$ is preferably hydroxyl. $R_{24}$ and $R_{25}$ are as preferred above for $R_7$. $R_{24}$ and $R_{25}$ are particularly preferably hydrogen or sulfo. Preferably, the dyes of the formula (12) contain only one or two sulfo groups in total.

Interesting dyes of the formula (12) are furthermore those in which $R_{22}$ is amino, $R_{23}$ and $R_{24}$ are hydrogen and $R_{25}$ is phenylsulfonyl which is unsubstituted or substituted by $C_1$–$C_4$alkyl, $C_1$–$C_4$alkoxy, halogen or sulfo. In this case, the dye contains only one radical $T_1$, which is a radical of the formula (6b), and the dye contains only two sulfo groups.

Particularly preferred dyes of the formula (12) are those of the formula

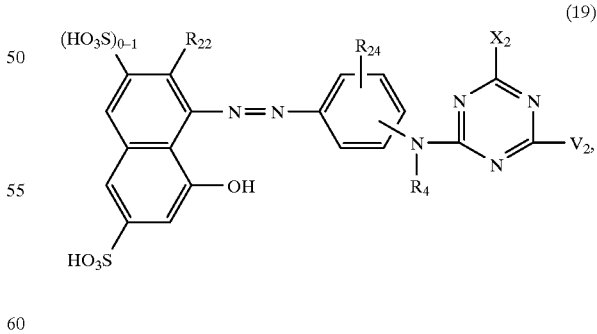

in which $R_4$, $R_{22}$, $R_{24}$, $X_2$ and $V_2$ are as defined and preferred above. $R_{22}$ is preferably amino or N-mono- or N,N-di-$C_1$–$C_4$alkylamino.

Especially preferred dyes of the formula (12) are those of the formula

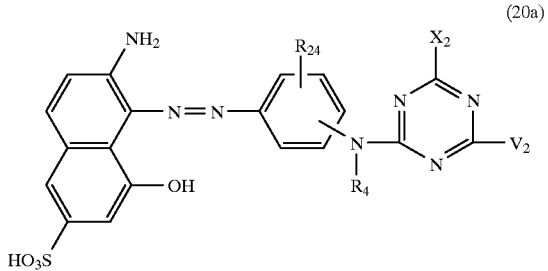

(20a)

and

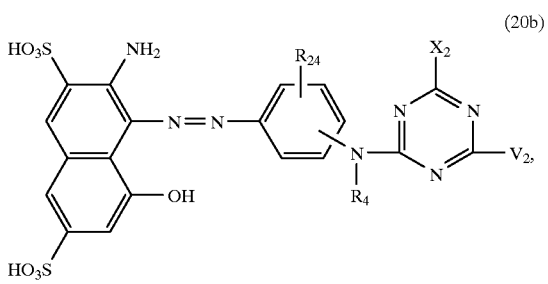

(20b)

in which $R_{24}$ is hydrogen or sulfo and $R_4$, $X_2$ and $V_2$ are as defined and preferred above. In the dye of the formula (20b), $R_{24}$ is preferably hydrogen. The dye of the formula (20a) is of particular interest here.

Interesting dyes of the formula (12) are furthermore those of the formula

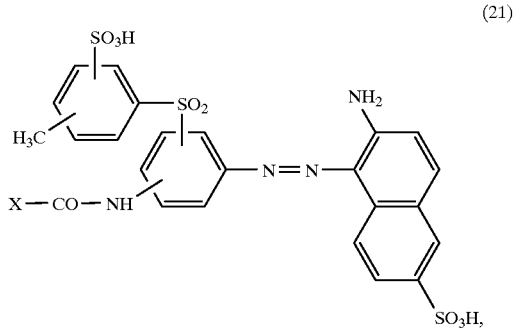

(21)

in which X is as defined and preferred above.

Dyes of the formula (13) are, in particular, those in which $R_{26}$ is hydrogen, $C_2$–$C_4$alkanoylamino, amino, N-mono- or N,N-di-$C_1$-$C_4$alkylamino, ureido, halogen or phenylcarbonylamino, which is unsubstituted or further substituted in the phenyl ring by $C_1$–$C_4$alkyl, $C_1$–$C_4$alkoxy, $C_2$–$C_4$alkanoylamino, halogen or sulfo. $R_{27}$ is preferably hydrogen and $R_{28}$ is preferably hydrogen or sulfo.

At least one yellow- or orange-dyeing dye of the formulae (8) to (11) together with at least one red-dyeing dye of the formulae (12) and (13) are preferably used in the process according to the invention. Particularly preferably, at least one dye of the formulae (8) and (9) together with at least one dye of the formula (12) are used. The dyes of the formulae (8) to (13) are as defined and preferred above.

Especially preferably, at least one yellow- or orange-dyeing dye of the formulae (14) and (16), in particular of the formulae (15a), (15b) and (17), together with at least one red-dyeing dye of the formula (19), in particular of the formulae (20a) and (20b), are used.

According to an interesting embodiment, at least one yellow- or orange-dyeing dye of the formula (18) together with at least one red-dyeing dye of the formula (21) are used.

The anthraquinone dyes of the formula (1) to be used together with the yellow- or orange-and red-dyeing dyes are as defined and preferred above, anthraquinone dyes of the formula (5) and, in particular, of the formula (4) being of particular importance.

The anthraquinone dyes of the formula (1) used in the process according to the invention for dichromatic or trichromatic dyeing or printing are known and can be prepared analogously to known dyes, for example by reacting compounds of the formulae

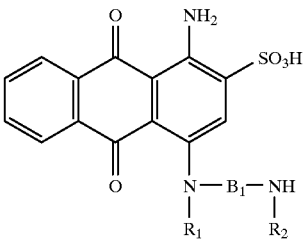

(22)

and

(23)

$H$—$V_1$ in which $R_1$, $R_2$, $B_1$ and $V_1$ are as defined above, with a cyanuric halide.

Since the individual abovementioned process steps can be carried out in a different sequence, and where appropriate also simultaneously, various process variants are possible. In general, the reaction is carried out stepwise, the sequence of the simple reactions between the individual reaction components advantageously depending on the particular conditions. Thus, for example, a compound of the formula (22) is reacted with a cyanuric halide and the resulting product is then subjected to a condensation reaction with a compound of the formula (23). Furthermore, a compound of the formula (23) can be reacted with a cyanuric halide and the resulting product can then be subjected to a condensation reaction with a compound of the formula (22).

The individual condensation reactions are carried out, for example, by processes which are known per se, as a rule in aqueous solution, at a temperature of, for example 0 to 50° C., in particular 0 to 10° C. and a pH of, for example, 3 to 10, in particular 3 to 8.

Furthermore, after the synthesis, conversion reactions can be carried out. For example, anthraquinone dyes of the formula (1) which contain sulfatoethylsulfonyl radicals or α,β-dihalopropionylamino radicals can be treated with a base, for example sodium hydroxide, the sulfatoethylsulfonyl radicals being converted into vinylsulfonyl radicals and the α,β-dihalopropionylamino radicals being converted into α-haloacryloylamino radicals.

The dyes of the formulae (8) to (13) are known or can be prepared analogously to known dyes. Thus, the dyes of the formulae (8) to (13) can be prepared, for example, by diazotization of the following amines and coupling to the following coupling components:

| | Amine | Coupling component |
|---|---|---|
| Dyes of the formula (8): | 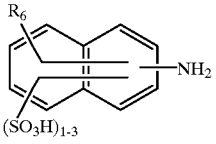 | 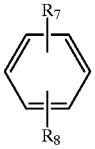 |
| Dyes of the formula (9): | 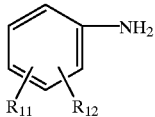 | 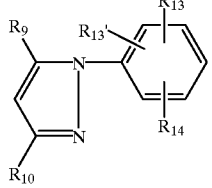 |
| Dyes of the formula (10): | 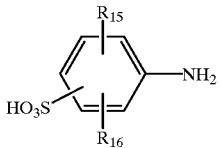 |  |
| Dyes of the formula (11): | 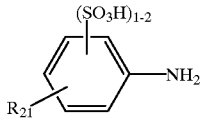 | 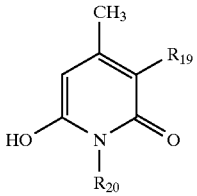 |
| Dyes of the formula (12): | 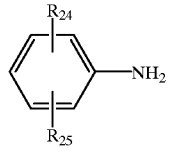 | 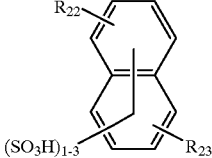 |
| Dyes of the formula (13): | 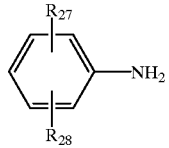 | 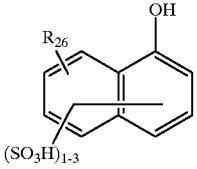 |

The amines and coupling components mentioned above for the individual dyes of the formulae (8) to (13) together additionally contain 1 to 3 radicals $T_1$.

The diazotization of the amines is as a rule carried out by the action of nitrous acid in aqueous-mineral acid solution at a low temperature, for example 0 to 15° C., and the coupling to the particular coupling component is carried out at acid or neutral to weakly alkaline pH values, in particular at a pH of 2 to 8.

Furthermore, dyes of the formulae (8) to (13) in which $T_1$ is a radical of the above formula (7a) or (7b) can be obtained by condensation of a dye containing amino groups with a cyanuric halide and a compound of the formula H—$V_2$ or H—$V_3$. The individual condensation reactions here can be carried out under the conditions described above for the preparation of the anthraquinone dyes.

The present invention furthermore relates to fibre-reactive anthraquinone dyes of the formula

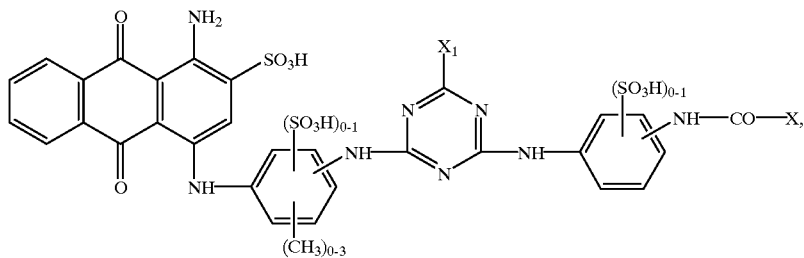
(24)

in which $X_1$ is fluorine or chlorine and X is the radical

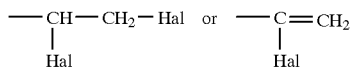

and Hal is bromine or chlorine, and the dye of the formula (24) contains two sulfo groups in total, Hal is preferably bromine.

The radical Y is preferably —Cl or, in particular, —OSO$_3$H.

Preferred dyes are those of the formula (26) or, in particular, of the formula (24).

The present invention furthermore relates to processes for the preparation of the dyes of the formulae (24) to (26).

The process for the preparation of the dyes of the formula (24) comprises reacting compounds of the formulae

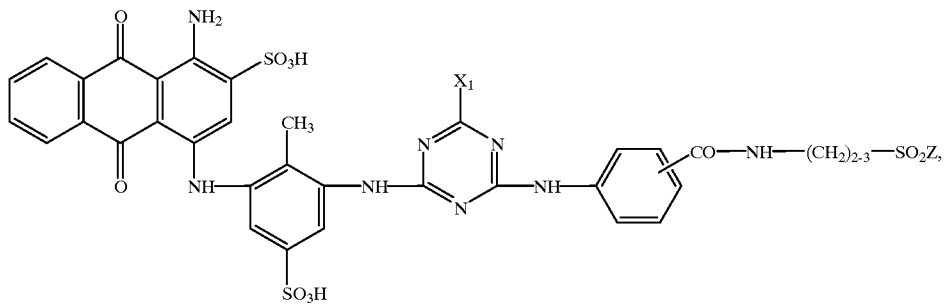
(25)

in which $X_1$ is fluorine or chlorine and Z is the radical —CH=CH$_2$ or —CH$_2$—CH$_2$—Y and Y is —Cl, —OSO$_3$H or —OCO—CH$_3$, and

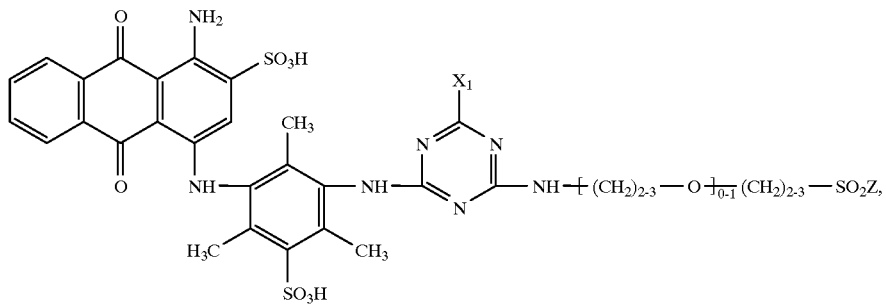
(26)

in which $X_1$ is fluorine or chlorine and Z is the radical —CH=CH$_2$ or —CH$_2$—CH$_2$-Y and Y is —Cl, —OSO$_3$H or —OCO—CH$_3$. $X_1$ is preferably chlorine.

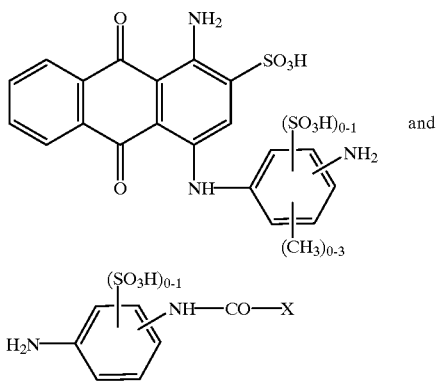

with cyanuric fluoride or cyanuric chloride.

The process for the preparation of the dyes of the formula (25) comprises reacting compounds of the formulae

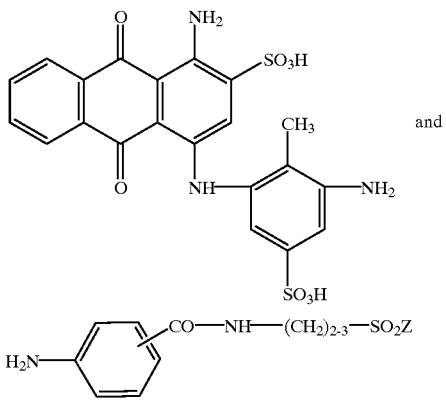

with cyanuric fluoride or cyanuric chloride.

The process for the preparation of the dyes of the formula (26) comprises reacting compounds of the formulae

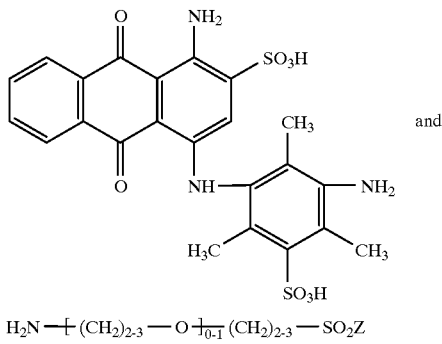

with cyanuric fluoride or cyanuric chloride.

The particular reactions can be carried out under the conditions described above for the preparation of the anthraquinone dyes of the formula (1).

The dyes used in the process according to the invention for dichromatic or trichromatic dyeing or printing and the anthraquinone dyes of the formulae (24) to (26) according to the invention exist either in the form of their free sulfonic acid or, preferably, as salts thereof.

Salts, are, for example, the alkali metal, alkaline earth metal or ammonium salts or the salts of an organic amine. Examples are the sodium, lithium, potassium or ammonium salts or the salt of mono-, di- or triethanolamine.

The dyes used in the process according to the invention and the anthraquinone dyes of the formulae (24) to (26) according to the invention can comprise further additives, for example sodium chloride or dextrin.

The process according to the invention for dichromatic or trichromatic dyeing or printing and the anthraquinone dyes of the formulae (24) to (26) according to the invention can be applied to the customary dyeing and printing processes. In addition to water and the dyes, the dye liquors or printing pastes can comprise further additives, for example wetting agents, antifoams, levelling agents or agents which influence the nature of the textile material, for example softening agents, additives for flame resistant treatment or soil-, water- and oil-repellent agents, as well as water-softening agents and natural or synthetic thickeners, for example alginates and cellulose ethers.

The amounts in which the individual dyes are used in the dyebaths or printing pastes can vary within wide limits, depending on the desired depth of shade, and in general amounts of 0.01 to 15% by weight, in particular 0.1 to 10% by weight, based on the goods to be dyed or the printing pastes, have proved advantageous.

Dyeing, which is carried out, in particular, by the exhaust method, is preferred.

Dyeing is preferably carried out at a pH of 3 to 7, in particular 4 to 6. The liquor ratio can be chosen within a wide range, for example from 1:5 to 1:50, preferably 1:5 to 1:30. Dyeing is preferably carried out at a temperature of 70 to 110° C., in particular 80 to 105° C.

To increase the wet fastness properties, and to remove any non-fixed dye, an after-treatment can be carried out at a pH of, for example, 8 to 9 and a temperature of, for example, 75 to 85° C.

The dyes used in the process according to the invention and the anthraquinone dyes of the formulae (24) to (26) according to the invention are distinguished in dichromatic or trichromatic dyeing or printing by a uniform colour build-up, good affinity and fixing properties, good constancy of shade, also in various concentrations, good fastness properties and, in particular, very good combination properties.

The process according to the invention for dichromatic or trichromatic dyeing or printing and the anthraquinone dyes of the formulae (24) to (26) according to the invention are suitable for dyeing and printing both natural polyamide fibre materials, for example wool, and synthetic polyamide fibre materials, for example polyamide 6 or polyamide 6,6, and are suitable for dyeing or printing wool and synthetic polyamide blend fabrics and yarns. Dyeing or printing of natural polyamide fibre materials, in particular wool, and preferably wool which has been given a washing machine-resistant treatment, is preferred.

The textile material mentioned can exist here in widely varying forms of processing, for example as fibre, yarn, woven fabric or knitted fabric, and in particular in the form of carpets.

Level dyeings with good allround properties, in particular good fastness to rubbing, wet processing, wet rubbing and light, are obtained.

In the following examples, parts are parts by weight. The temperatures are degrees Celsius. Parts by weight bear the same relation to parts by volume as the gram to the cubic centimeter.

EXAMPLE 1

0.57 part of the yellow-dyeing dye of the formula

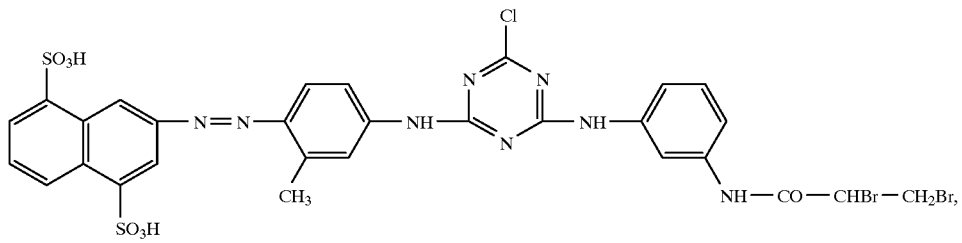

(101)

0.53 part of the red-dyeing dye of the formula

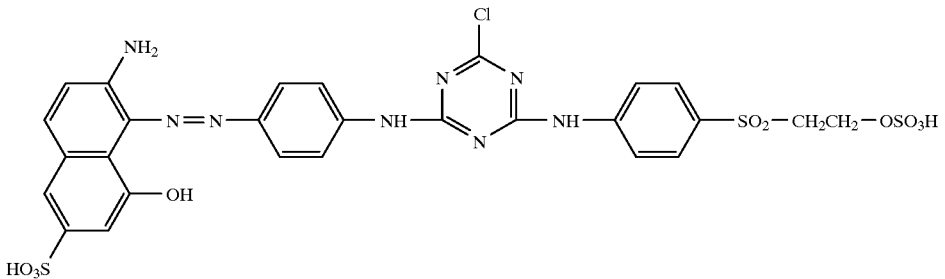

102 and 0.65 part of the blue-dyeing dye of the formula

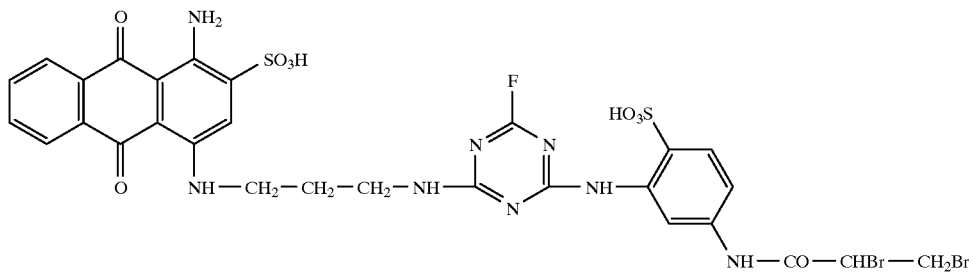

(103)

are dissolved in 200 parts of water, and 0.5 part of sodium sulfate, 0.1 part of a levelling assistant (based on the condensation product of a higher aliphatic amine and ethylene oxide) and 0.5 part of sodium acetate are added. The pH is then brought to a value of 5.5 with acetic acid (80%). The dyebath is heated at 50° C. for 10 minutes, and 10 parts of a woollen fabric are then added. The bath is heated to a temperature of 100° C. in the course of about 50 minutes and dyeing is carried out at this temperature for 60 minutes. Thereafter, the bath is allowed to cool to 90° C. and the dyed goods are removed. The woollen fabric is washed with hot and cold water and then spun and dried. A brown dyeing which has good light and wet fastness properties and a good levelness is obtained.

EXAMPLES 2 to 97

The procedure described in Example 1 is repeated, except that, in place of 0.57 part of the yellow-dyeing dye of the formula (101), 0.53 part of red-dyeing dye of the formula (102) and 0.65 part of the blue-dyeing dye of the formula (103), the dyes shown in column 2 in Table 1 below are used in the amounts stated therein, likewise affording brown dyeings.

TABLE 1

| Ex. | Dyes |
|---|---|
| 2 | 0.53 part of the red-dyeing dye of the formula (102),<br>0.65 part of the blue-dyeing dye of the formula (103) and<br>0.7 part of the yellow-dyeing dye of the formula |

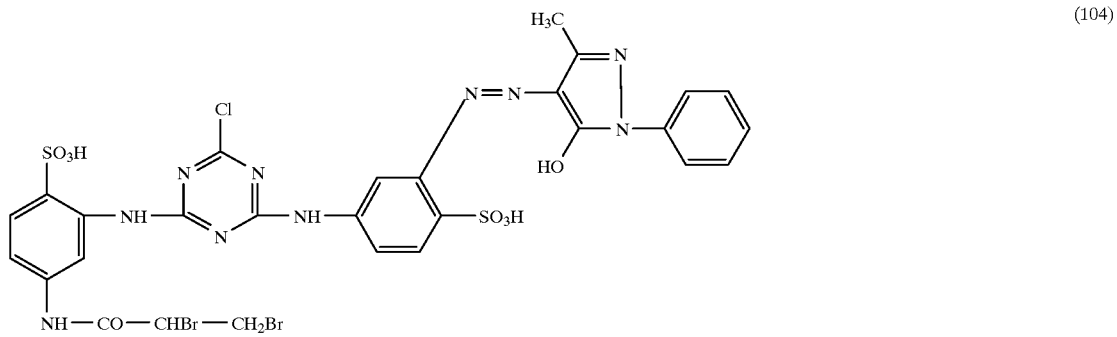

(104)

| | |
|---|---|
| 3 | 0.53 part of the red-dyeing dye of the formula (102),<br>0.65 part of the blue-dyeing dye of the formula (103) and<br>0.6 part of the yellow-dyeing dye of the formula |

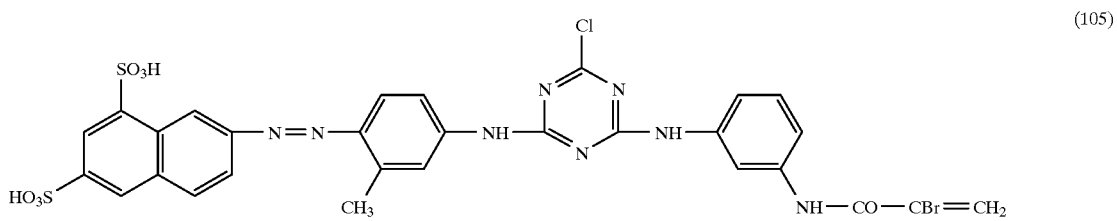

(105)

| | |
|---|---|
| 4 | 0.53 part of the red-dyeing dye of the formula (102),<br>0.65 part of the blue-dyeing dye of the formula (103) and<br>0.46 part of the yellow-dyeing dye of the formula |

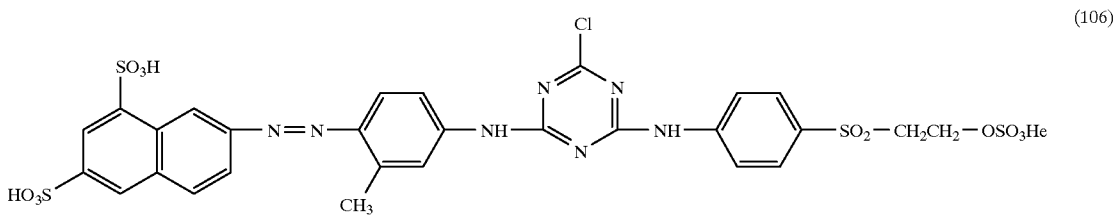

(106)

0.53 part of the red-dyeing dye of the formula (102),
0.65 part of the blue-dyeing dye of the formula (103) and
0.57 part of the yellow-dyeing dye of the formula

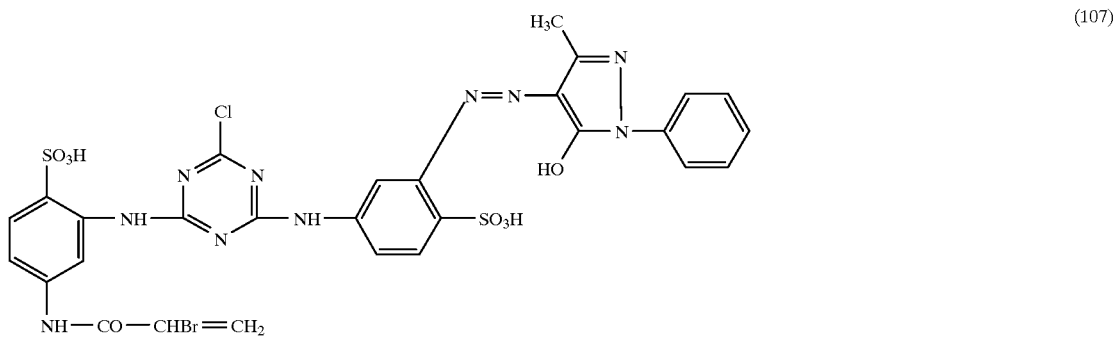

(107)

6  0.53 part of the red-dyeing dye of the formula (102),
   0.83 part of the blue-dyeing dye of the formula TABLE 1-continued Ex. Dyes

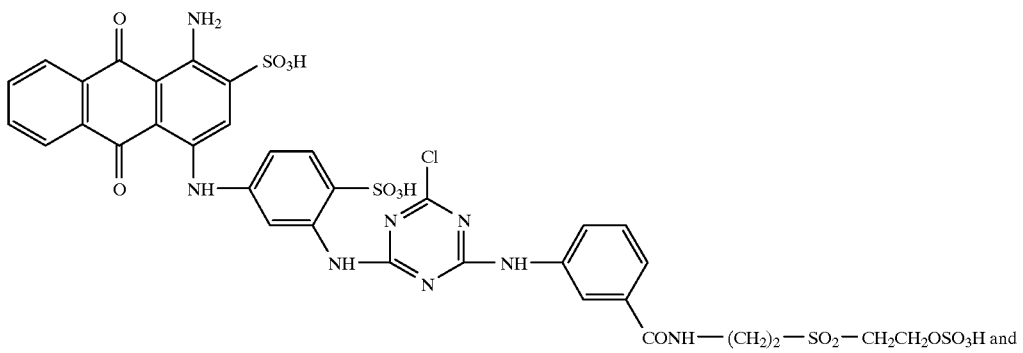
(108)

and
0.57 part of the yellow-dyeing dye of the formula

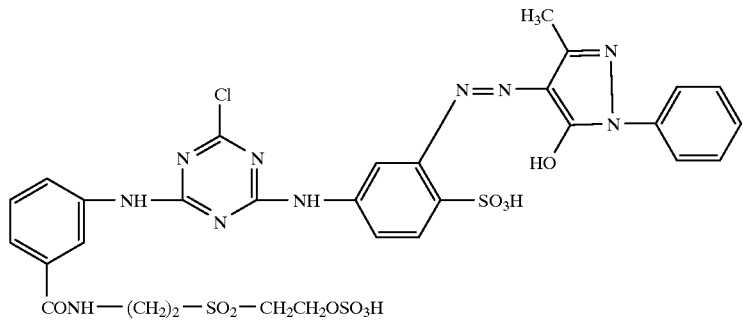
(109)

7  0.53 part of the red-dyeing dye of the formula (102),
   0.83 part of the blue-dyeing dye of the formula (108) and
   0.6 part of the yellow-dyeing dye of the formula

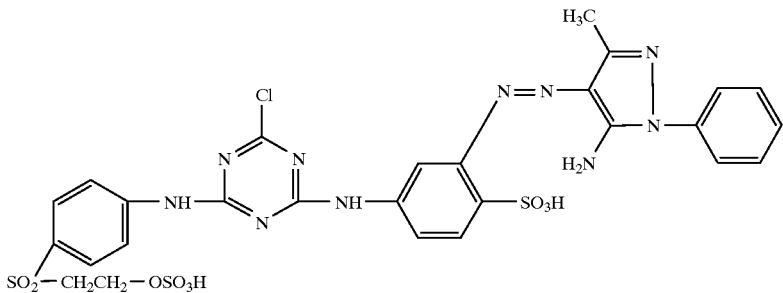
(110)

8  0.53 part of the red-dyeing dye of the formula (102),
   0.83 part of the blue-dyeing dye of the formula (108) and
   0.47 part of the yellow-dyeing dye of the formula (106)
9  0.53 part of the red-dyeing dye of the formula (102),
   0.66 part of the blue dyeing dye of the formula

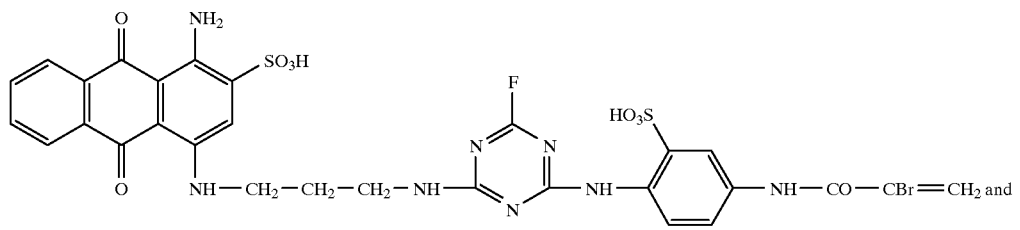
(111)

and
0.57 part of the yellow-dyeing dye of the formula (101)
10  0.53 part of the red-dyeing dye of the formula (102), TABLE 1-continued

| Ex. | Dyes |
|---|---|

0.73 part of the blue-dyeing dye of the formula

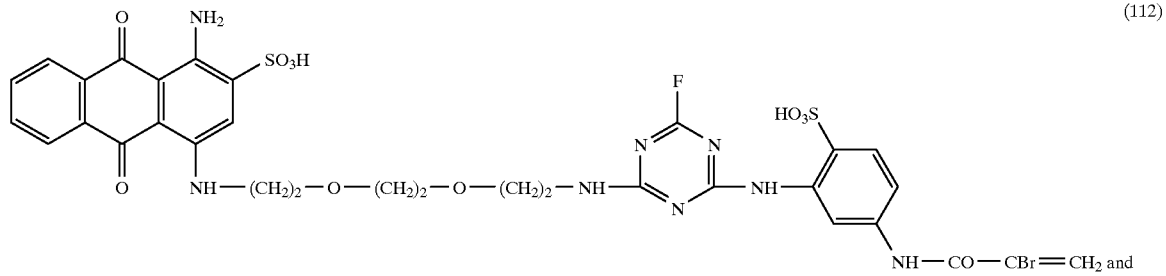

(112)

and
0.6 part of the yellow-dyeing dye of the formula (105)

11  0.53 part of the red-dyeing dye of the formula (102),
0.6 part of the blue-dyeing dye of the formula

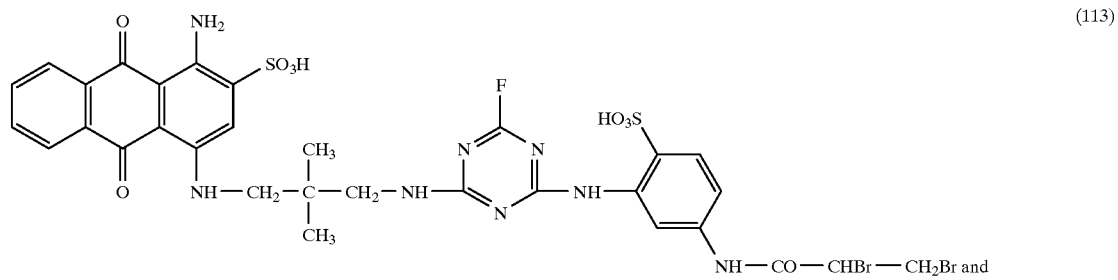

(113)

and
0.52 part of the yellow dyeing dye of the formula

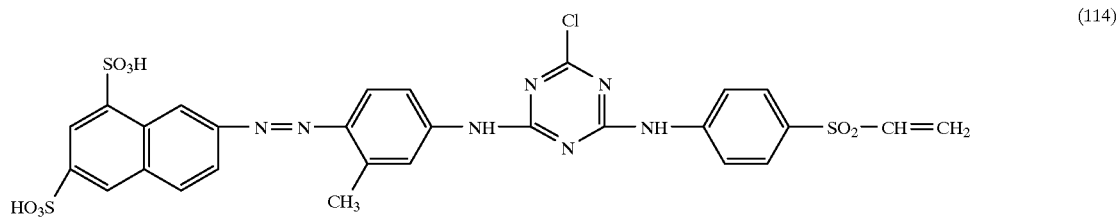

(114)

12  0.53 part of the red-dyeing dye of the formula (102),
0.6 part of the blue-dyeing dye of the formula (113) and
0,7 part of the yellow-dyeing dye of the formula (104)
13  0.53 part of the red-dyeing dye of the formula (102),
0.6 part of the blue-dyeing dye of the formula (103) and
0.57 part of the yellow-dyeing dye of the formula (107)
14  0.53 part of the red-dyeing dye of the formula (102),
0.6 part of the blue-dyeing dye of the formula (113) and
0.57 part of the yellow-dyeing dye of the formula (101)
15  0.53 part of the red-dyeing dye of the formula (102),
0.6 part of the blue-dyeing dye of the formula (113) and
0.53 part of the yellow-dyeing dye of the formula

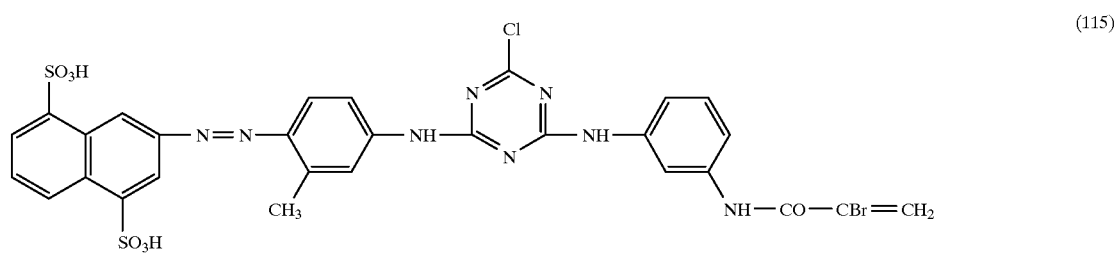

(115)

16  0.53 part of the red-dyeing dye of the formula (102),
0.67 part of the blue-dyeing dye of the formula TABLE 1-continued Ex. Dyes

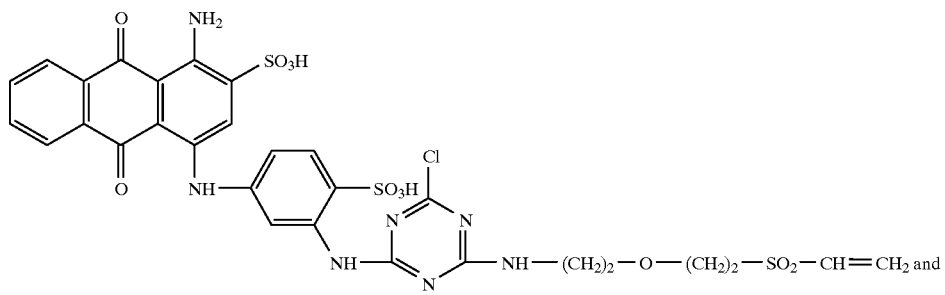
(116)

and
0.6 part of the yellow-dyeing dye of the formula (110)
17 0.53 part of the red-dyeing dye of the formula (102),
0.67 part of the blue-dyeing dye of the formula (116) and
0.7 part of the yellow-dyeing dye of the formula (109)
18 0.53 part of the red-dyeing dye of the formula (102),
0.65 part of the blue-dyeing dye of the formula (116) and
0.53 part of the yellow-dyeing dye of the formula (101)
19 0.53 part of the red-dyeing dye of the formula (102),
0.67 part of the blue-dyeing dye of the formula (116) and
0.47 part of the yellow-dyeing dye of the formula (106)
20 0.53 part of the red-dyeing dye of the formula (102),
0.67 part of the blue-dyeing dye of the formula (116) and
0.47 part of the yellow-dyeing dye of the formula

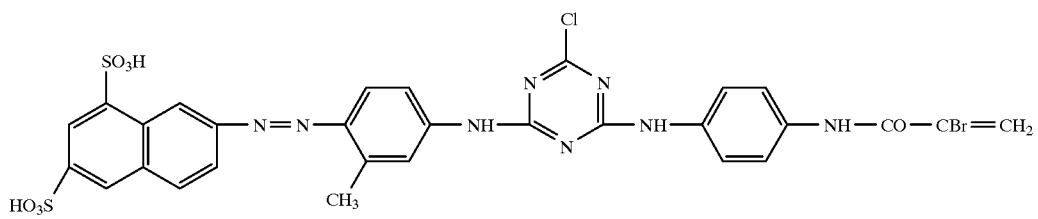
(117)

21 0.53 part of the red-dyeing dye of the formula (102),
0.67 part of the blue-dyeing dye of the formula (116) and
0.53 part of the yellow-dyeing dye of the formula (115)
22 0.53 part of the red-dyeing dye of the formula (102),
0.67 part of the blue-dyeing dye of the formula (116) and
0.55 part of the yellow-dyeing dye of the formula

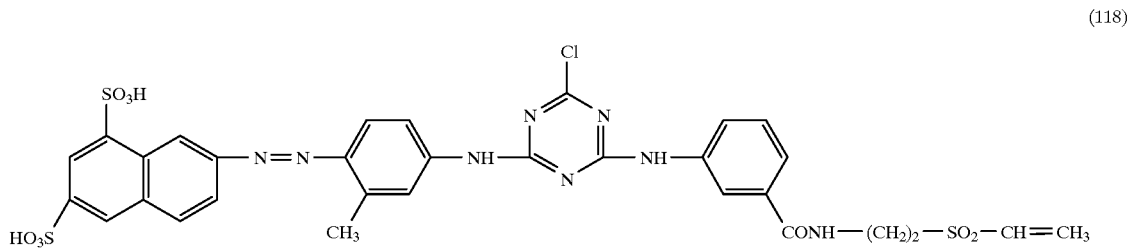
(118)

23 0.53 part of the red-dyeing dye of the formula (102),
0.67 part of the blue-dyeing dye of the formula (116) and
0.5 part of the yellow-dyeing dye of the formula

TABLE 1-continued

Ex. Dyes (119)

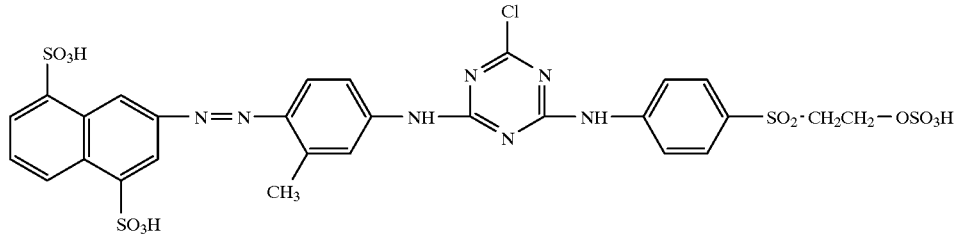

24  0.53 part of the red-dyeing dye of the formula (102),
    0.67 part of the blue-dyeing dye of the formula (116) and
    0.4 part of the yellow-dyeing dye of the formula (120)

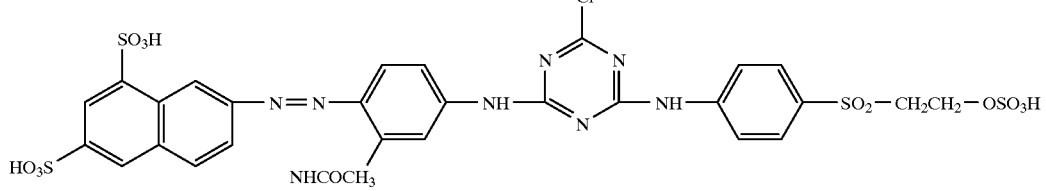

25  0.53 part of the red-dyeing dye of the formula (102),
    0.67 part of the blue-dyeing dye of the formula (116) and
    0.55 part of the yellow-dyeing dye of the formula (121)

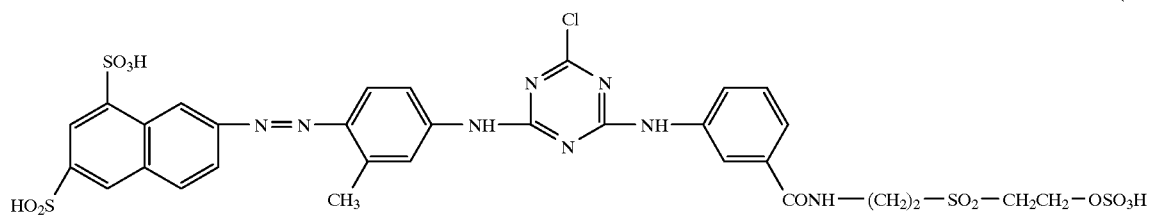

26  0.53 part of the red-dyeing dye of the formula (102),
    0.67 part of the blue-dyeing dye of the formula (116) and
    0.55 part of the yellow-dyeing dye of the formula (122)

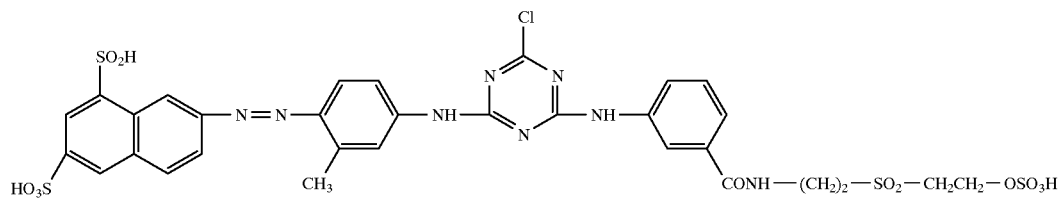

27  0.53 part of the red-dyeing dye of the formula (102),
    0.63 part of the blue-dyeing dye of the formula (123)

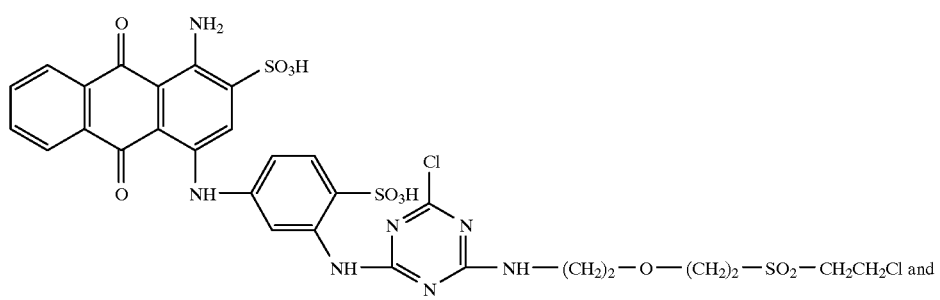

TABLE 1-continued

| Ex. | Dyes |
|---|---|
| | and |
| | 0.6 part of the yellow-dyeing dye of the formula (110) |
| 28 | 0.53 part of the red-dyeing dye of the formula (102), |
| | 0.63 part of the blue-dyeing dye of the formula (123) and |
| | 0.7 part of the yellow-dyeing dye of the formula (109) |
| 29 | 0.53 part of the red-dyeing dye of the formula (102), |
| | 0.63 part of the blue-dyeing dye of the formula (123) and |
| | 0.46 part of the yellow-dyeing dye of the formula (106) |
| 30 | 0.53 part of the red-dyeing dye of the formula (102), |
| | 0.65 part of the blue-dyeing dye of the formula (123) and |
| | 0.7 part of the yellow-dyeing dye of the formula (104) |
| 31 | 0.53 part of the red-dyeing-dye of the formula (102), |
| | 0.73 part of the blue-dyeing dye of the formula |

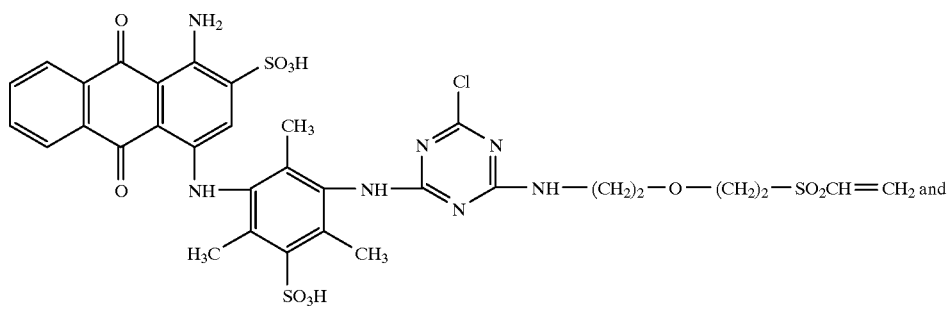

(124)

and
0.53 part of the yellow-dyeing dye of the formula (115)

32  0.53 part of the red-dyeing dye of the formula (102),
    0.73 part of the blue-dyeing dye of the formula (124) and
    0.47 part of the yellow-dyeing dye of the formula

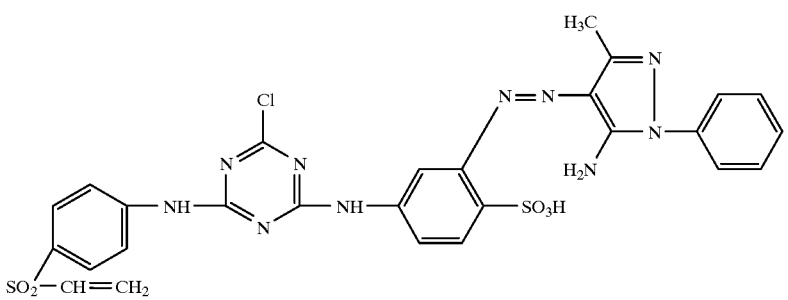

(125)

33  0.53 part of the red-dyeing dye of the formula (102),
    0.73 part of the blue-dyeing dye of the formula (124) and
    0.5 part of the yellow-dyeing dye of the formula (119)
34  0.53 part of the red-dyeing dye of the formula (102),
    0.73 part of the blue-dyeing dye of the formula (124) and
    0.4 part of the yellow-dyeing dye of the formula (120)
35  0.53 part of the red-dyeing dye of the formula (102),
    0.73 part of the blue-dyeing dye of the formula (124) and
    0.53 part of the yellow-dyeing dye of the formula (101)
36  0.53 part of the red-dyeing dye of the formula (102),
    0.63 part of the blue-dyeing of the formula

TABLE 1-continued

Ex. Dyes

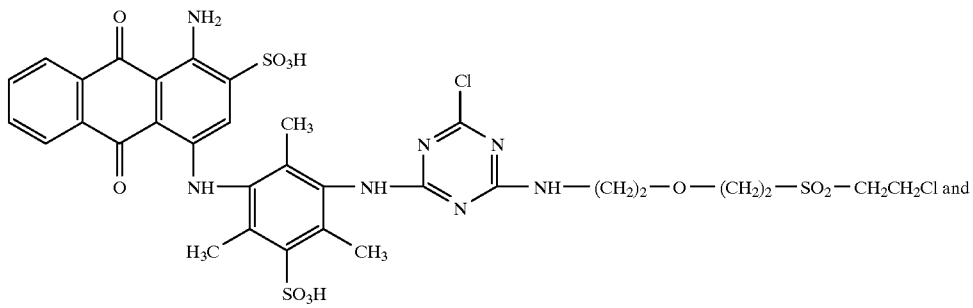
(126)

and
0.6 part of the yellow-dyeing dye of the formula (110)
37 0.53 part of the red-dyeing dye of the formula (102),
 0.63 part of the blue-dyeing dye of the formula (126) and
 0.47 part of the yellow-dyeing dye of the formula (106)
38 0.53 part of the red-dyeing dye of the formula (102),
 0.63 part of the blue-dyeing dye of the formula

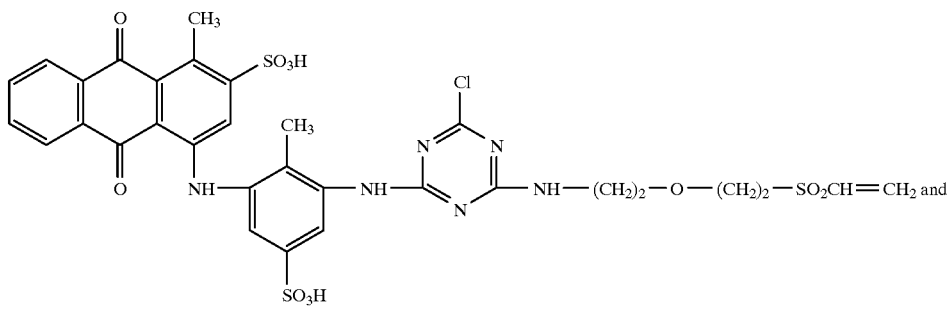
(127)

and
0.6 part of the yellow-dyeing dye of the formula (110)
39 0.7 part of the red-dyeing dye of the formula

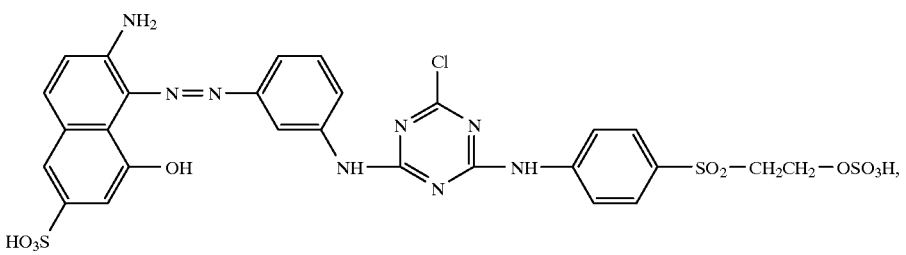
(128), 0.83 part of the blue-dyeing dye of the formula (108) and
0.7 part of the yellow-dyeing dye of the formula (109)
40 0.7 part of the red-dyeing dye of the formula (128),
 0.8 part of the blue-dyeing dye of the formula

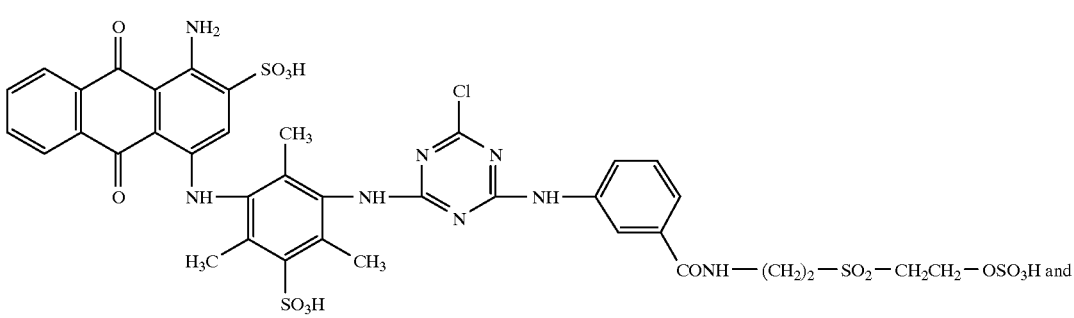
(129)

TABLE 1-continued

| Ex. | Dyes |
|---|---| and
0.7 part of the yellow-dyeing dye of the formula (109)
41  1.1 parts of red-dyeing dye of the formula

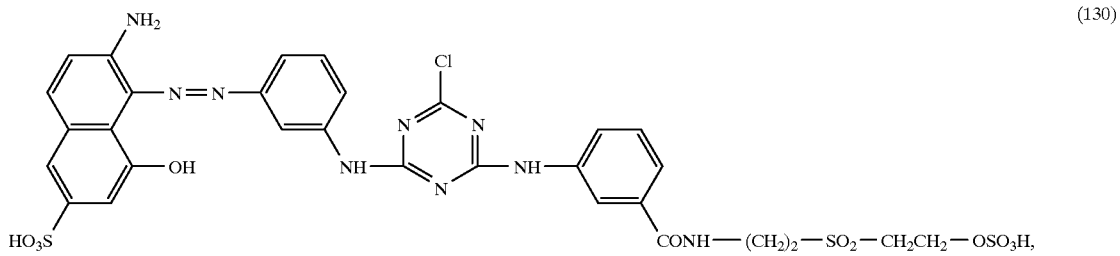
(130)

0.68 part of the blue-dyeing dye of the formula (103) and
0.7 part of the yellow-dyeing dye of the formula (104)
42  0.53 part of the red-dyeing dye of the formula

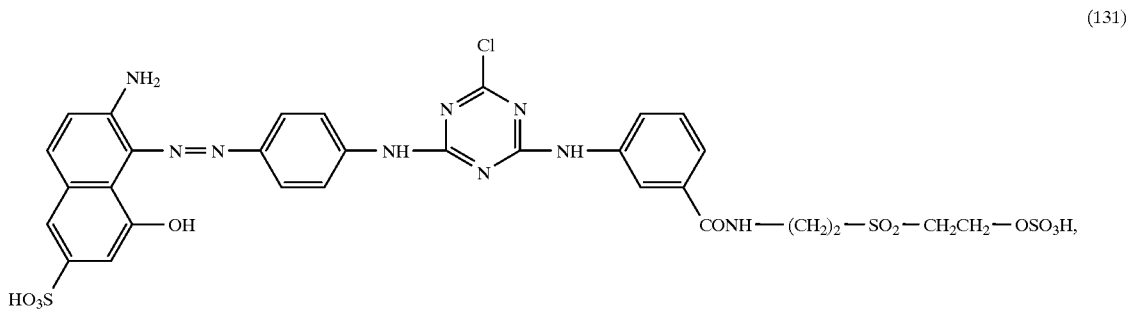
(131)

0.73 part of the blue-dyeing dye of the formula (124) and
0.4 part of the yellow-dyeing dye of the formula (120)
43  0.53 part of the red-dyeing dye of the formula (131),
0.63 part of the blue-dyeing dye of the formula

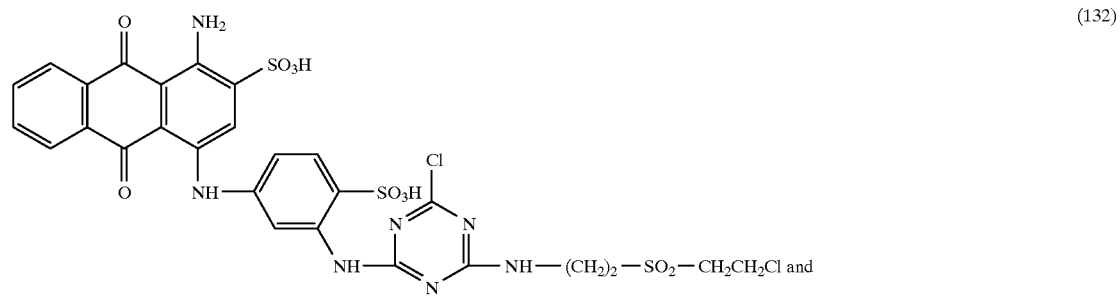
(132)

and
0.6 part of the yellow-dyeing dye of the formula (110)
44  0.53 part of the red-dyeing dye of the formula (131),
0.63 part of the blue-dyeing dye of the formula (132) and
0.7 part of the yellow-dyeing dye of the formula (104)
45  0.53 part of the red-dyeing dye of the formula (131),
0.63 part of the blue-dyeing dye of the formula (132) and
0.57 part of the yellow-dyeing dye of the formula (101)
46  0.53 part of the red-dyeing dye of the formula (131),
0.67 part of the blue-dyeing dye of the formula (116) and
0.6 part of the yellow-dyeing dye of the formula (110)
47  0.53 part of the red-dyeing dye of the formula (131),
0.67 part of the blue-dyeing dye of the formula (116) and
0.5 part of the yellow-dyeing dye of the formula (119)
48  0.53 part of the red-dyeing dye of the formula (131),
0.63 part of the blue-dyeing dye of the formula (127) and
0.6 part of the yellow-dyeing dye of the formula (110)
49  0.4 part of the red-dyeing dye of the formula TABLE 1-continued

| Ex. | Dyes |
|---|---|

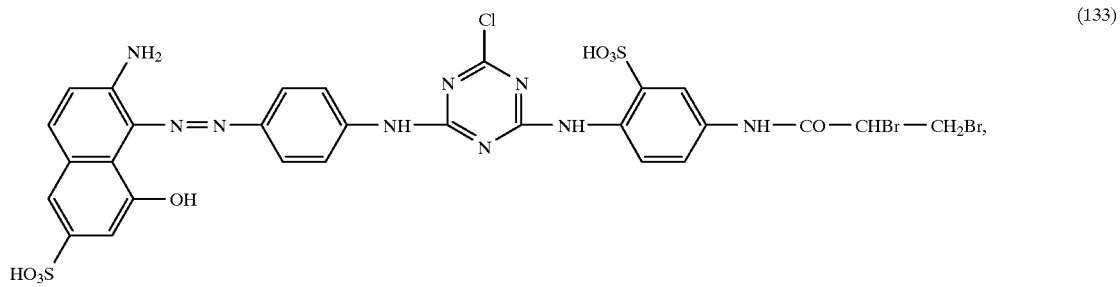
(133)

0.65 part of the blue-dyeing dye of the formula (103) and
0.33 part of the yellow-dyeing dye of the formula

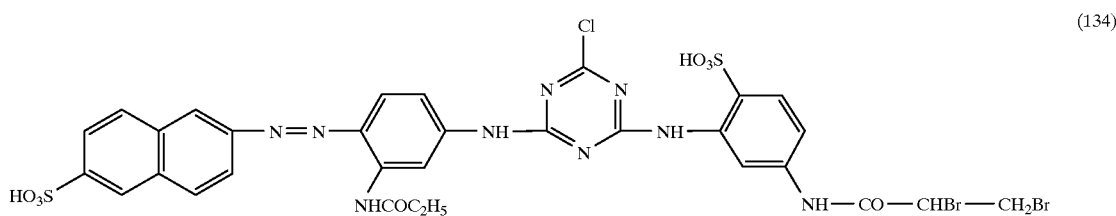
(134)

50  0.4 part of the red-dyeing dye of the formula (133),
    0.65 part of the blue-dyeing dye of the formula (103) and
    0.33 part of the yellow-dyeing dye of the formula

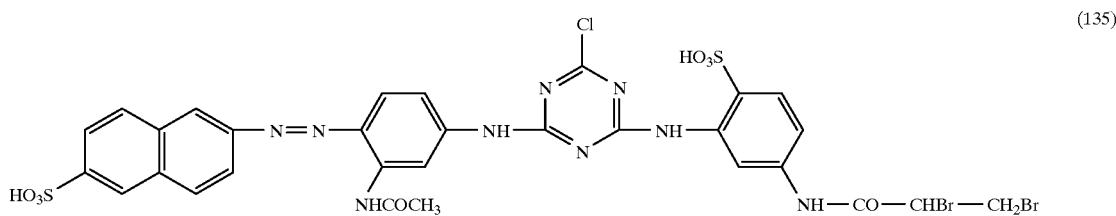
(135)

51  0.4 part of the red-dyeing dye of the formula (133),
    0.65 part of the blue-dyeing dye of the formula (103) and
    0.7 part of the yellow-dyeing dye of the formula (104)
52  0.4. part of the red-dyeing dye of the formula (133),
    0.65 part of the blue-dyeing dye of the formula (103) and
    0.57 part of the yellow-dyeing dye of the formula (101)
53  0.4 part of the red-dyeing dye of the formula (133),
    0.65 part of the blue-dyeing dye of the formula (103) and
    0.6 part of the yellow-dyeing dye of the formula (105)
54  0.4 part of the red-dyeing dye of the formula (133),
    0.67 part of the blue-dyeing dye of the formula (111) and
    0.57 part of the yellow-dyeing dye of the formula (101)
55  0.4 part of the red-dyeing dye of the formula (133),
    0.67 part of the blue-dyeing dye of the formula (116) and
    0.53 part of the yellow-dyeing dye of the formula (101)
56  0.4 part of the red-dyeing dye of the formula (133),
    0.63 part of the blue-dyeing dye of the formula (127) and
    0.53 part of the yellow-dyeing dye of the formula (101)
57  0.4 part of the red-dyeing dye of the formula (133),
    0.63 part of the blue-dyeing dye of the formula (127) and
    0.47 part of the yellow-dyeing dye of the formula (125)
58  0.4 part of the red-dyeing dye of the formula (133),
    0.63 part of the blue-dyeing dye of the formula (127) and
    0.55 part of the yellow-dyeing dye of the formula (122)
59  0.52 part of the red-dyeing dye of the formula TABLE 1-continued

| Ex. | Dyes |
|---|---|

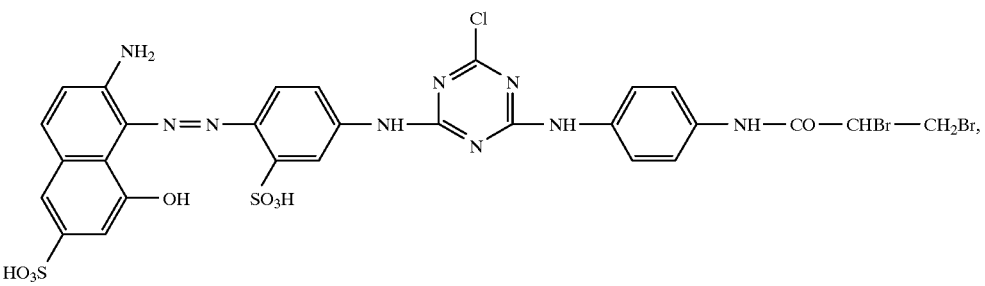

(136)

0.65 part of the blue-dyeing dye of the formula (103) and
0.57 part of the yellow-dyeing dye of the formula (101)
60  0.52 part of the red-dyeing dye of the formula (136),
0.65 part of the blue-dyeing dye of the formula (103) and
0.6 part of the yellow-dyeing dye of the formula (105)
61  0.52 part of the red-dyeing dye of the formula (136),
0.73 part of the blue-dyeing dye of the formula (112) and
0.57 part of the yellow-dyeing dye of the formula (101)
62  0.52 part of the red-dyeing dye of the formula (136),
0.66 part of the blue-dyeing dye of the formula (111) and
0.57 part of the yellow-dyeing dye of the formula (101)
63  0.52 part of the red-dyeing dye of the formula (136),
0.63 part of the blue-dyeing dye of the formula

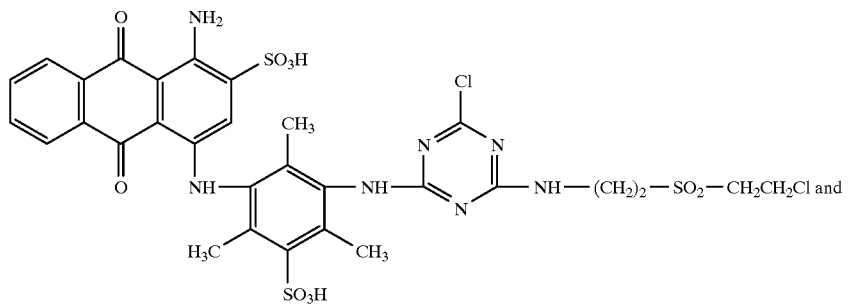

(137)

and
0.7 part of the yellow-dyeing dye of the formula (104)
64  0.52 part of the red-dyeing dye of the formula (136),
0.73 part of the blue-dyeing dye of the formula (124) and
0.53 part of the yellow-dyeing dye of the formula (101)
65  0.52 part of the red-dyeing dye of the formula (136),
0.6 part of the blue-dyeing dye of the formula

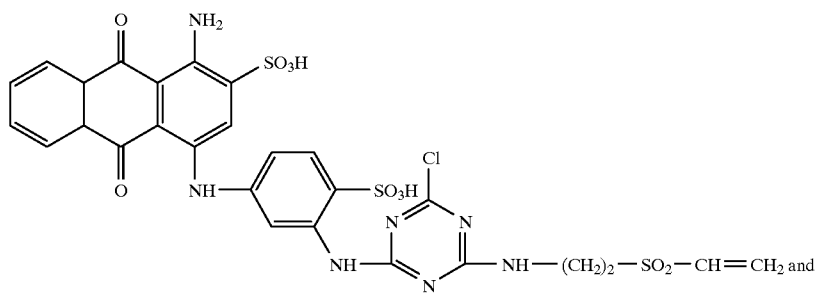

(138)

and
0.7 part of the yellow-dyeing dye of the formula (104)
66  0.52 part of the red-dyeing dye of the formula (136),
0.67 part of the blue-dyeing dye of the formula (116) and
0.53 part of the yellow-dyeing dye of the formula (101)
67  0.52 part of the red-dyeing dye of the formula (136),
0.63 part of the blue-dyeing dye of the formula (127) and
0.53 part of the yellow-dyeing dye of the formula (101)
68  0.52 part of the red-dyeing dye of the formula (136),
0.63 part of the blue-dyeing dye of the formula (127) and TABLE 1-continued

| Ex. | Dyes |
|---|---|
| | 0.55 part of the yellow-dyeing dye of the formula (118) |
| 69 | 0.48 part of the red-dyeing dye of the formula |

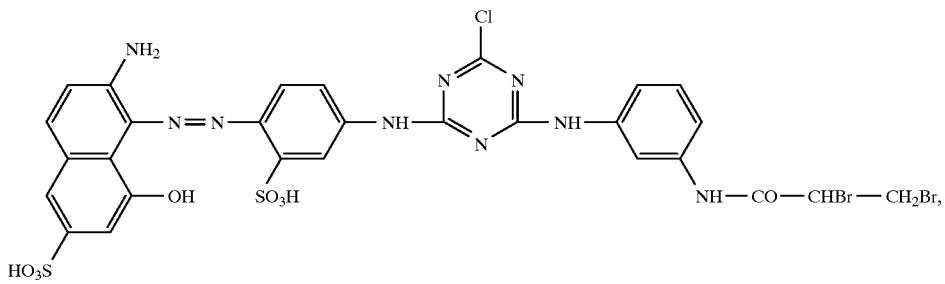
(139)

| | |
|---|---|
| | 0.65 part of the blue-dyeing dye of the formula (103) and |
| | 0.7 part of the yellow-dyeing dye of the formula (104) |
| 70 | 0.52 part of the red-dyeing dye of the formula (139), |
| | 0.65 part of the blue-dyeing dye of the formula (103) and |
| | 0.57 part of the yellow-dyeing dye of the formula (101) |
| 71 | 0.48 part of the red-dyeing dye of the formula (139), |
| | 0.73 part of the blue-dyeing dye of the formula (112) and |
| | 0.57 part of the yellow-dyeing dye of the formula (101) |
| 72 | 0.37 part of the red-dyeing dye of the formula (139), |
| | 0.63 part of the blue-dyeing dye of the formula (127) and |
| | 0.4 part of the yellow-dyeing dye of the formula (120) |
| 73 | 0.37 part of the red-dyeing dye of the formula (139), |
| | 0.63 part of the blue-dyeing dye of the formula (127) and |
| | 0.55 part of the yellow-dyeing dye of the formula (122) |
| 74 | 0.57 part of the red-dyeing dye of the formula |

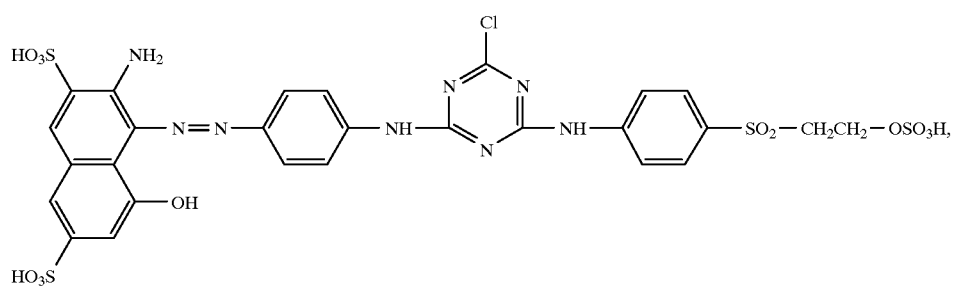
(140)

| | |
|---|---|
| | 0.65 part of the blue-dyeing dye of the formula (103) and |
| | 0.57 part of the yellow-dyeing dye of the formula (101) |
| 75 | 0.53 part of the red-dyeing dye of the formula |

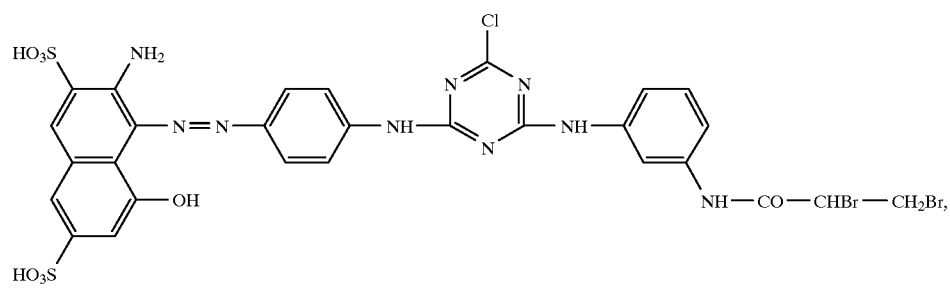
(141)

| | |
|---|---|
| | 0.65 part of the blue-dyeing dye of the formula (103) and |
| | 0.57 part of the yellow-dyeing dye of the formula (101) |
| 76 | 0.53 part of the red-dyeing dye of the formula (141), |
| | 0.73 part of the blue-dyeing dye of the formula (112) and |
| | 0.7 part of the yellow-dyeing dye of the formula (104) |
| 77 | 0.53 part of the red-dyeing dye of the formula (141), |
| | 0.73 part of the blue-dyeing dye of the formula (124) and |
| | 0.53 part of the yellow-dyeing dye of the formula (115) |
| 78 | 0.53 part of the red-dyeing dye of the formula (141), |
| | 0.67 part of the blue-dyeing dye of the formula (116) and |

TABLE 1-continued

Ex. Dyes 0.53 part of the yellow-dyeing dye of the formula (101)
79 0.6 part of the red-dyeing dye of the formula

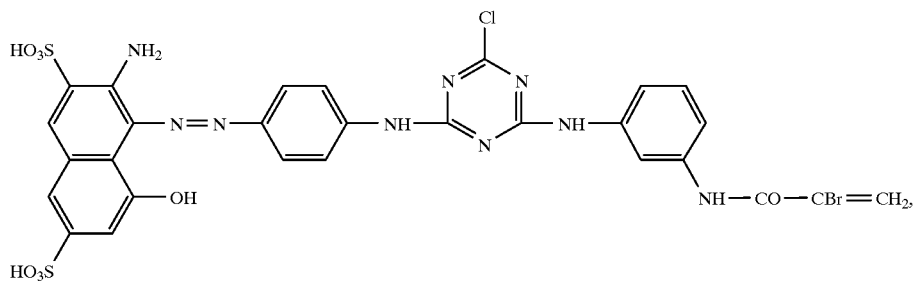

(142)

0.83 part of the blue-dyeing dye of the formula (103) and
0.6 part of the yellow-dyeing dye of the formula (105)
80 0.6 part of the red-dyeing dye of the formula (142),
0.73 part of the blue-dyeing dye of the formula (112) and
0.57 part of the yellow-dyeing dye of the formula (101)
81 0.32 part of the red-dyeing dye of the formula

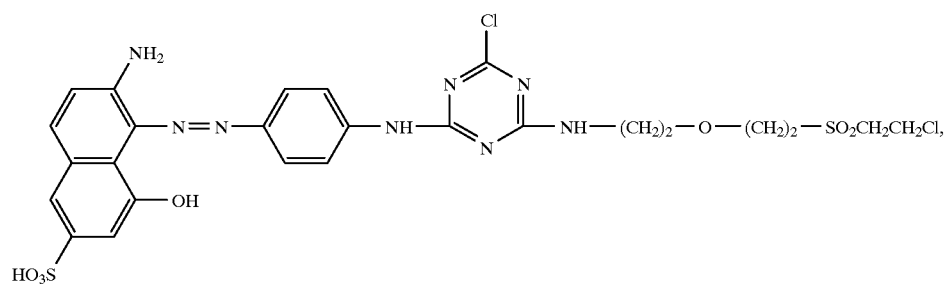

(143)

0.6 part of the blue-dyeing dye of the formula

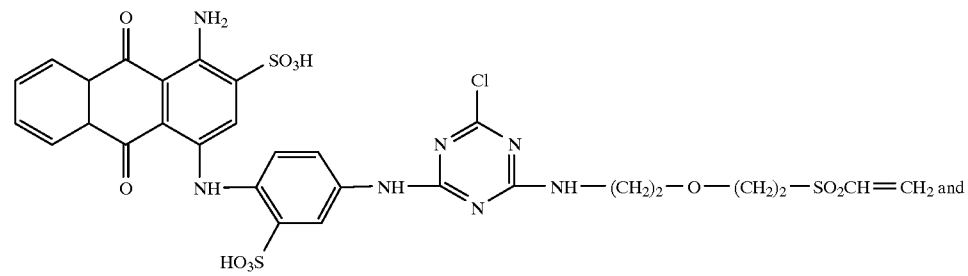

(144)

and
0.53 part of the yellow-dyeing dye of the formula

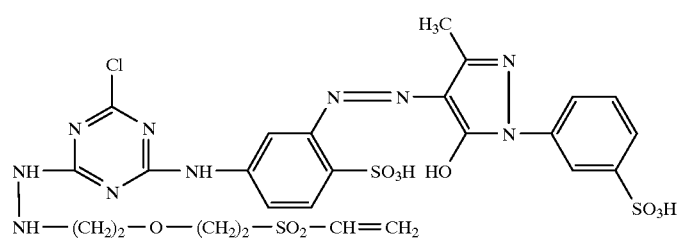

(145)

82 0.48 part of the red-dyeing dye of the formula

TABLE 1-continued

| Ex. | Dyes |
|---|---|

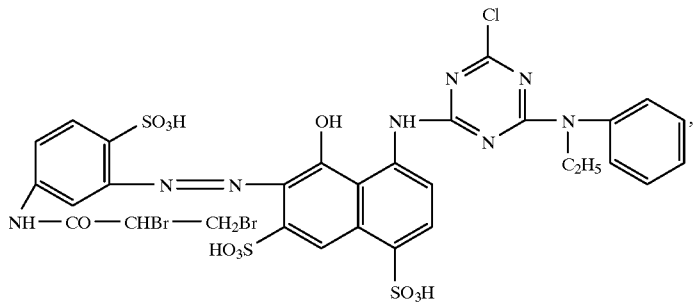
(146)

0.6 part of the blue-dyeing dye of the formula (103) and
0.7 part of the yellow-dyeing dye of the formula (104)
83  0.48 part of the red-dyeing dye of the formula (146),
0.6 part of the blue-dyeing dye of the formula (113) and
0.57 part of the yellow-dyeing dye of the formula (107)
84  0.48 part of the red-dyeing dye of the formula (146),
0.73 part of the blue-dyeing dye of the formula (124) and
0.53 part of the yellow-dyeing dye of the formula (115)
85  0.40 part of the red-dyeing dye of the formula (133),
0.63 part of the blue-dyeing dye of the formula (123) and
0.57 part of the yellow-dyeing dye of the formula (101)
86  0.40 part of the red-dyeing dye of the formula (133),
0.63 part of the blue-dyeing dye of the formula (123) and
0.46 part of the yellow-dyeing dye of the formula (106)
87  0.40 part of the red-dyeing dye of the formula (133),
0.63 part of the blue-dyeing dye of the formula (123) and
0.42 part of the yellow-dyeing dye of the formula

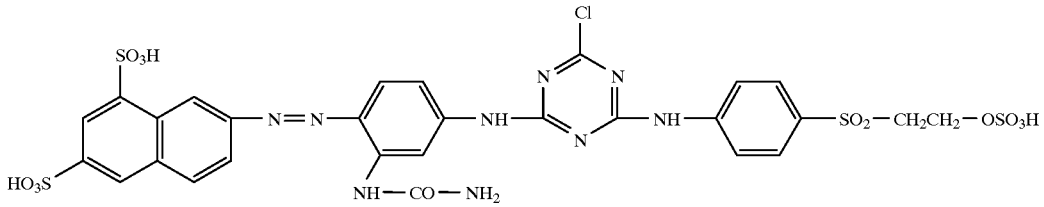

88  0.40 part of the red-dyeing dye of the formula (133)
0.63 part of the blue-dyeing dye of the formula (123) and
0.30 part of the yellow-dyeing dye of the formula

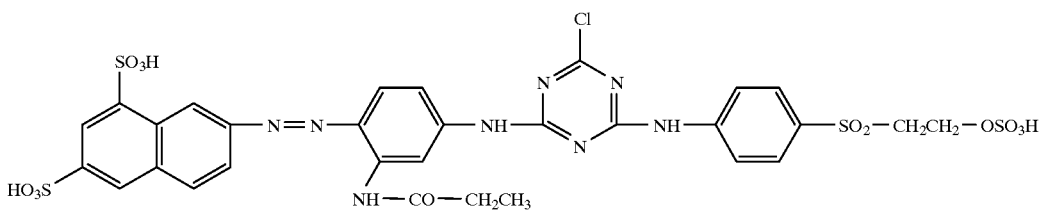

89  0.40 part of the red-dyeing dye of the formula (133),
0.63 part of the blue-dyeing dye of the formula (123) and
0.50 part of the yellow-dyeing dye of the formula (119)
90  0.40 part of the red-dyeing dye of the formula (133),
0.63 part of the blue-dyeing dye of the formula (123) and
0.40 part of the yellow-dyeing dye of the formula (120)
91  0.40 part of the red-dyeing dye of the formula (133),
0.63 part of the blue-dyeing dye of the formula (123) and
0.55 part of the yellow-dyeing dye of the formula (121)
92  0.40 part of the red-dyeing dye of the formula (133),
0.63 part of the blue-dyeing dye of the formula (123) and
0.58 part of the yellow-dyeing dye of the formula

TABLE 1-continued

Ex. Dyes

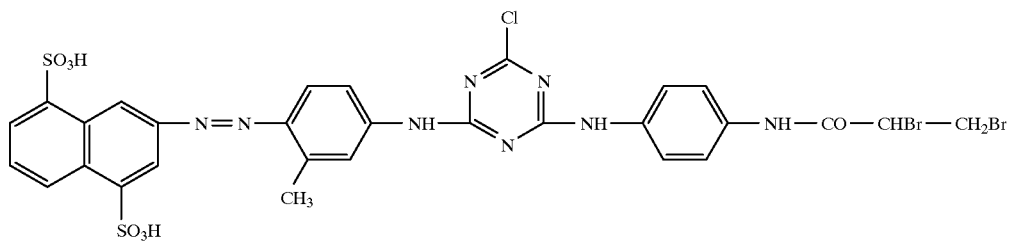

93 0.40 part of the red-dyeing dye of the formula (133),
0.63 part of the blue-dyeing dye of the formula (123) and
0.90 part of the yellow-dyeing dye of the formula

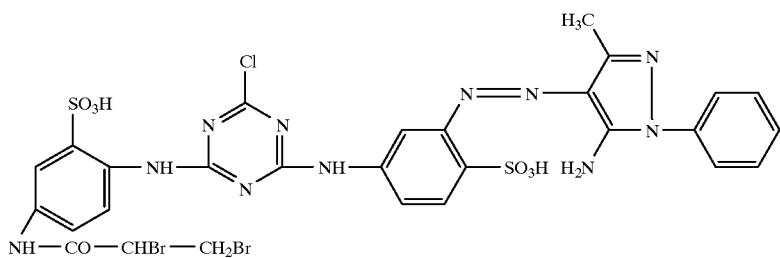

94 0.40 part of the red-dyeing dye of the formula (133),
0.63 part of the blue-dyeing dye of the formula (123) and
0.93 part of the yellow-dyeing dye of the formula

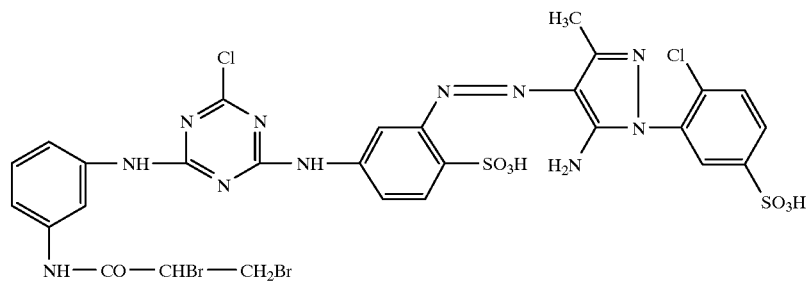

95 0.40 part of the red-dyeing dye of the formula (133),
0.63 part of the blue-dyeing dye of the formula (123) and
0.55 part of the yellow-dyeing dye of the formula

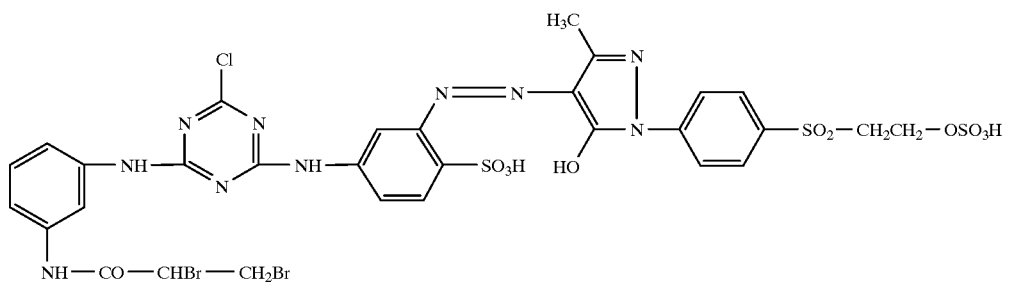

96 0.40 part of the red-dyeing dye of the formula (133)
0.63 part of the blue-dyeing dye of the formula (123) and
0.65 part of the yellow-dyeing dye of the formula TABLE 1-continued Ex. Dyes

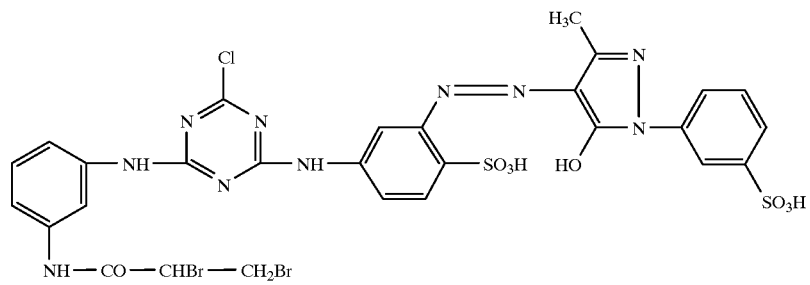

97  0.40 part of the red-dyeing dye of the formula (133),
0.63 part of the blue-dyeing dye of the formula (123) and
0.60 part of the yellow-dyeing dye of the formula

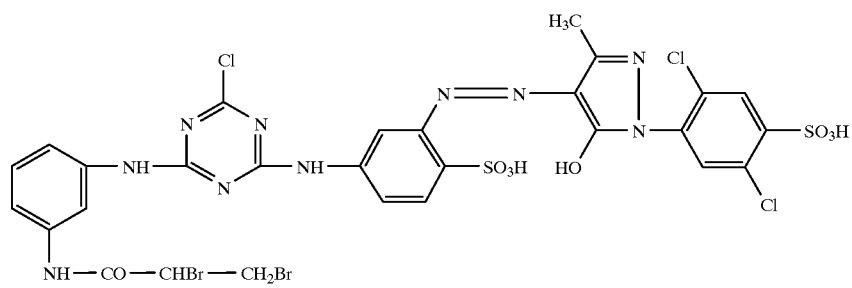

Instead of the combination of three dyes described in the above Examples 1 to 97, a combination of only two of the dyes described in the particular examples can also be used.

EXAMPLES 98 to 100

The procedure described in Example 1 is repeated, except that, in place of 0.57 part of the yellow-dyeing dye of the formula (101), 0.53 part of the red-dyeing dye of the formula (102) and 0.65 part of the blue-dyeing dye of the formula (103), the dyes shown in column 2 in Table 2 below are used in the amounts stated therein, affording green dyeings.

TABLE 2

Ex. Dyes 98  1.10 parts of the blue-dyeing dye of the formula (124) and
1.4 parts of the yellow-dyeing dye of the formula

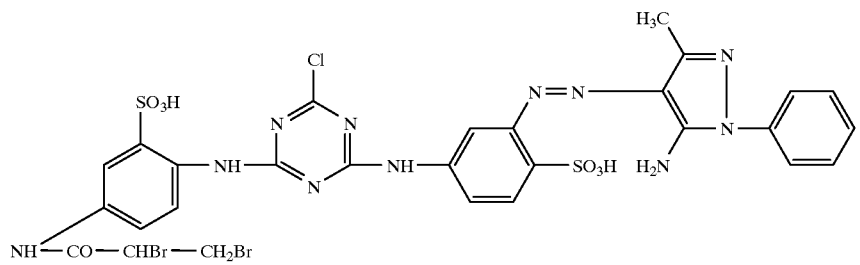

99  1.10 parts of the blue-dyeing dye of the formula (124) and
1.3 parts of the yellow-dyeing dye of the formula

TABLE 2-continued

Ex. Dyes

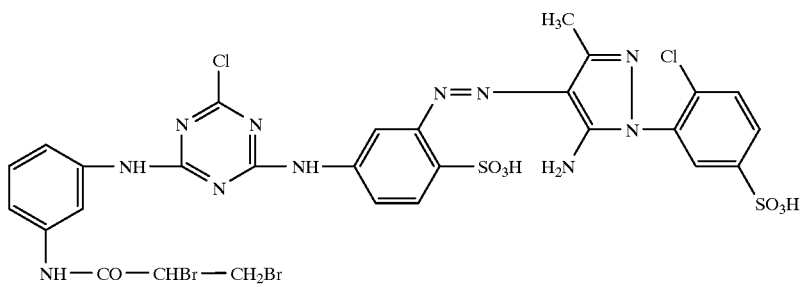

100  1.0 part of the blue-dyeing dye of the formula (123) and
1.0 part of the yellow-dyeing dye of the formula

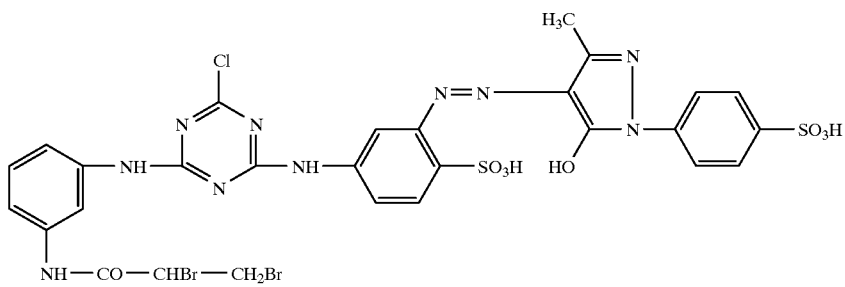

EXAMPLE 101

0.107 part of the yellow-dyeing dye of the formula (101), 0.11 part of the red-dyeing dye of the formula (133) and 0.133 part of the blue-dyeing dye of the formula (123) are dissolved in 200 parts of water and 0.1 part of a levelling agent (based on the condensation product of an aliphatic amine and ethylene oxide) and 0.2 part of sodium acetate are added. A pH of 5 is established with acetic acid (80%). The dyebath is heated to 30° C. and 10 parts of a woollen tricot which has been given a washing machine-resistant treatment (chlorine/Hercosett method) are added. The dyebath is heated to 60° C. in the course of 30 minutes, kept at this temperature for 15 minutes and then heated further to the boiling point in the course of 40 minutes. After a dyeing time of 75 minutes at the boiling point, the dye liquor is cooled to 80° C. The woollen tricot is rinsed briefly with hot water.

If appropriate, an after-treatment is carried out with a new liquor which comprises 200 parts of water and 0.4 part of sodium bicarbonate, in order to improve the wet fastness properties. This liquor (pH about 8.5) is heated rapidly to 85° C. with the dyed goods and the goods are treated at this temperature for 15 minutes. The dyed goods are then rinsed with hot and cold water, 0.1 part of formic acid (85%) is added to the last rinsing bath for acidification, and the dyeing is finished in the customary manner.

PREPARATION EXAMPLE 1 a) 4.7 parts of cyanuric chloride are suspended in 47 parts of ice, 23 parts of water and 0.025 part of $Na_2HPO_4 \cdot 12H_2O$, at a temperature of 0 to 2° C. in the course of 10 to 15 minutes. A solution of 13 parts of a compound of the formula (147)

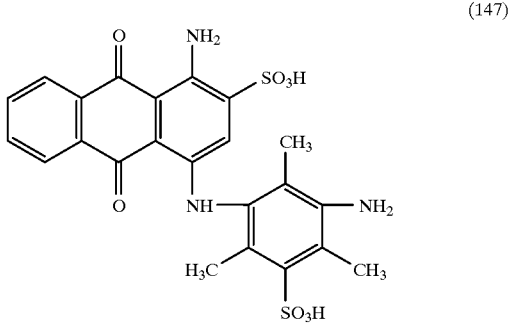

in 150 parts of water and 18.1 parts of an aqueous 2 normal sodium hydroxide solution are then metered in at a temperature of 0 to 2° C. in the course of 45 minutes, the pH being kept at a value of 5 by addition of aqueous 2 normal sodium hydroxide solution. The mixture is subsequently stirred at a temperature of 0 to 2° C. for 40 minutes. A solution which comprises the compound, shown in the form of the free acid, of the formula

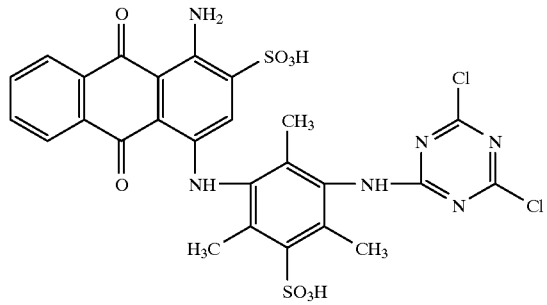

(148)

is obtained.

b) 8.5 parts of a compound of the formula

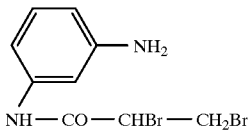

(149)

are dissolved in 40 parts of water and 100 parts of acetone. The solution thus obtained is added dropwise to the solution obtained according to a), which has been cooled to a temperature of 0 to 2° C., in the course of 45 minutes. During the addition, the pH is kept at a value of 6 by means of aqueous 2 normal sodium hydroxide solution. The mixture is subsequently stirred at a temperature of 0 to 2° C. and a pH of 6 overnight. After addition of sodium chloride, the mixture is subsequently stirred in a ice-bath for 1 hour and the dye is filtered off, washed with aqueous sodium chloride solution and dried at a temperature of 40° C. A dye which, in the form of the free acid, is the compound of the formula

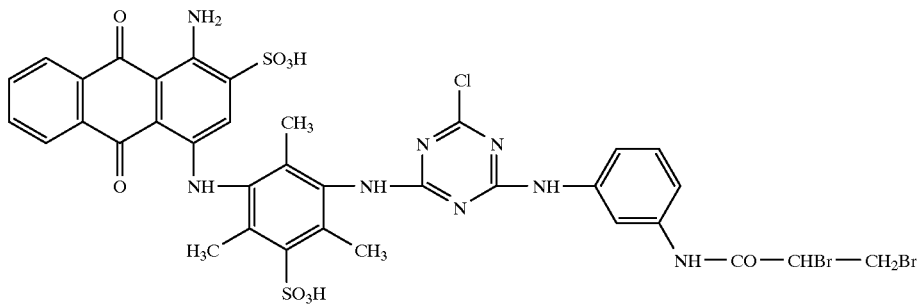

(150)

is obtained. The dye of the formula (150) dyes wool and synthetic polyamide fibre material in blue colour shades.

PREPARATION EXAMPLES 2 to 8

The dyes shown in the form of the free acid in column 2 in Table 3 below can be obtained in a manner analogous to the instructions in Preparation Example 1. If appropriate, the second condensation reaction is carried out at room temperature. The dyes shown in the following table dye wool and synthetic polyamide fibre material in blue colour shades.

TABLE 3

| Preparation Example | Dye |
| --- | --- |
| 2 | |

TABLE 3-continued
| Preparation Example | Dye |
|---|---|
| 3 | 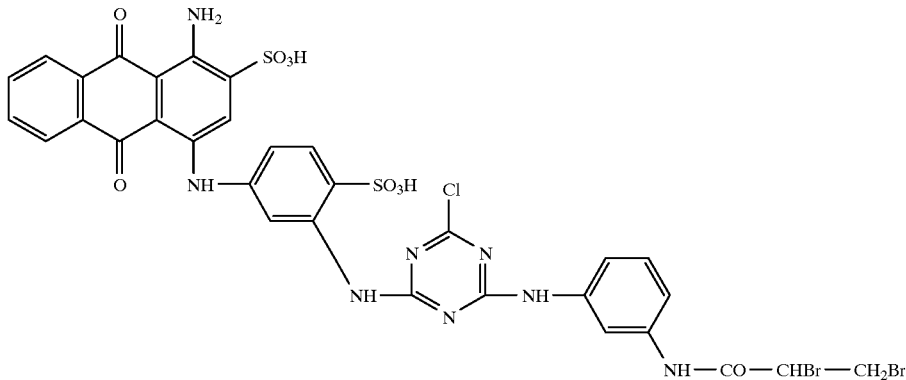 |
| 4 | 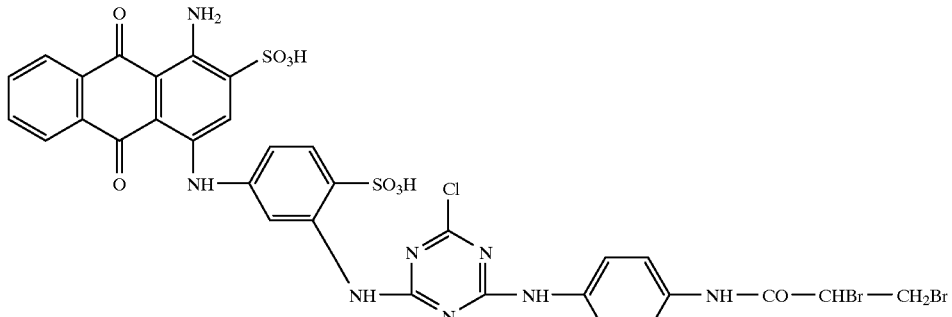 |
| 5 | 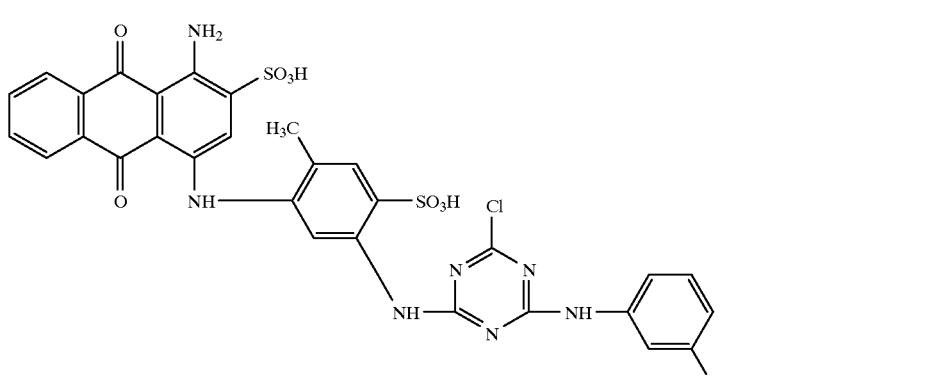 |

TABLE 3-continued

| Preparation Example | Dye |
|---|---|
| 6 | Anthraquinone dye with $NH_2$, $SO_3H$ on one ring; $NH$-linked to tetramethyl-sulfophenyl-$NH$-triazine(Cl)-$NH$-$(CH_2)_2$-$SO_2$-$CH_2CH_2Cl$ |
| 7 | Anthraquinone dye with $NH_2$, $SO_3H$; $NH$-linked to tetramethyl-sulfophenyl-$NH$-triazine(Cl)-$NH$-$(CH_2)_2$-$O$-$(CH_2)_2$-$SO_2$-$CH_2CH_2Cl$ |
| 8 | Anthraquinone dye with $NH_2$, $SO_3H$; $NH$-linked to methyl-sulfophenyl-$NH$-triazine(Cl)-$NH$-phenyl-$CONH$-$(CH_2)_2$-$SO_2$-$CH_2CH_2OSO_3H$ |

PREPARATION EXAMPLE 9

11.25 parts of the dye obtainable according to Example 1 are dissolved in 150 parts of water at room temperature and a pH of 3.05. The solution is then heated to a temperature of 60° C., the pH is kept at a value of 7.5 by addition of an aqueous 1 normal sodium hydroxide solution and acrylation is carried out under these conditions for a total of 5 hours. The mixture is then cooled to room temperature and, after addition of sodium chloride, subsequently stirred for 2 hours, and the resulting dye is filtered off, rinsed with a 10% aqueous sodium chloride solution and dried at a temperature of 40° C. A dye which, in the form of the free acid, is the compound of the formula

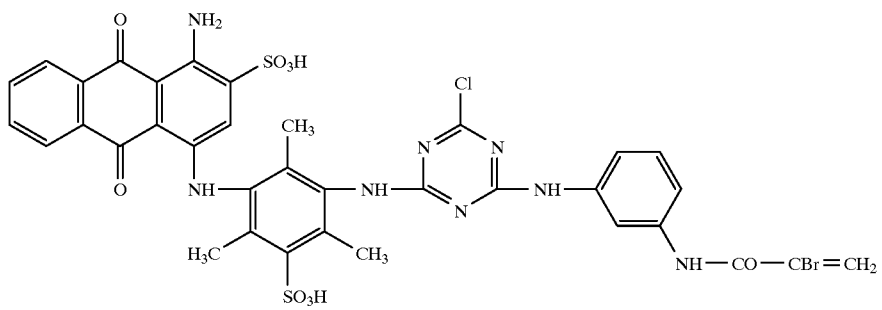

is obtained. The dye of the formula (151) dyes wool and synthetic polyamide fibre material in blue colour shades.

PREPARATION EXAMPLES 10 to 15

The dyes shown in the form of the free acid in column 2 in Table 4 below, which dye wool and synthetic polyamide fibre material in blue colour shades, can be obtained in a manner analogous to the instructions in Preparation Example 9. If the dyes contain no radical of the formula —NH—CO—CBr=CH$_2$, vinylation is carried out at a pH of 8 to 10.

TABLE 4

| Preparation Example | Dye |
|---|---|
| 10 | (structure shown) |
| 11 | (structure shown) |

TABLE 4-continued
| Preparation Example | Dye |
|---|---|
| 12 | 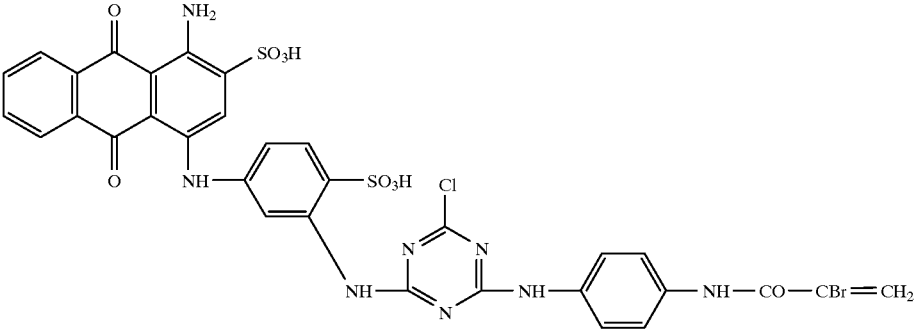 |
| 13 | 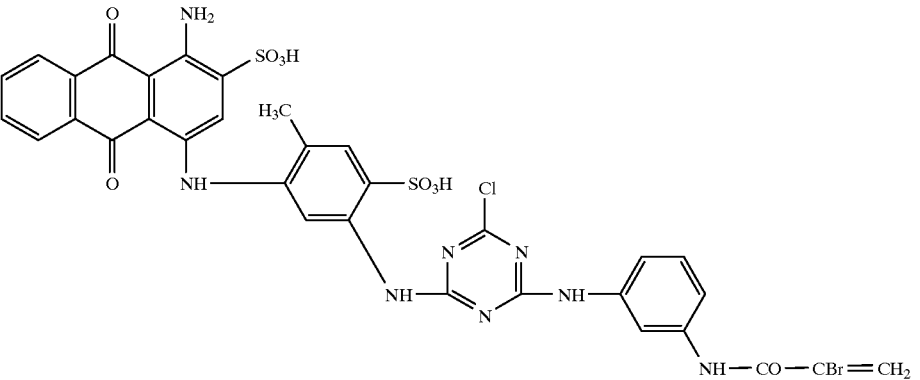 |
| 14 | 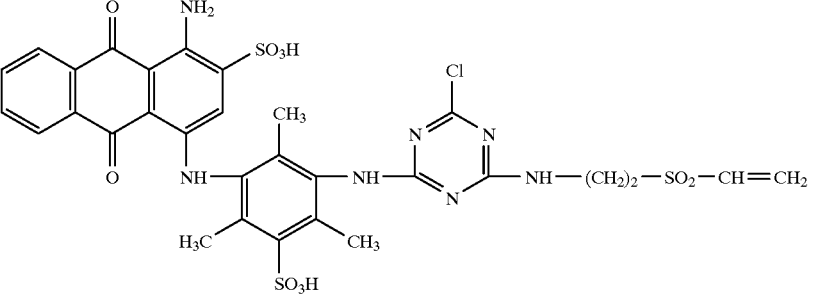 |
| 15 | 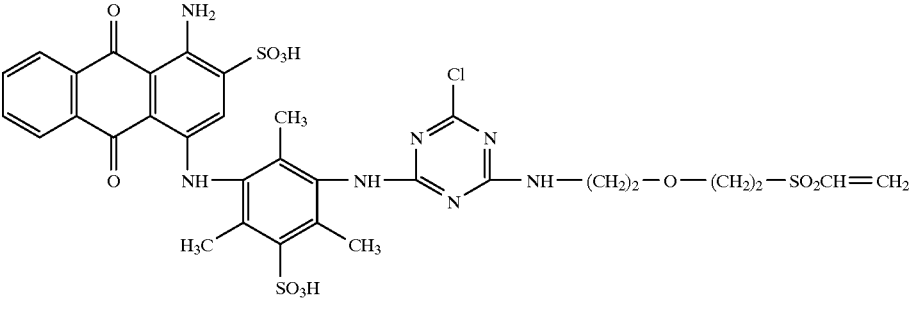 |

What is claimed is:

1. A process for trichromatic dyeing or printing of natural or synthetic polyamide fibre material, which comprises using at least one blue-dyeing fibre-reactive anthraquinone dye of the formula

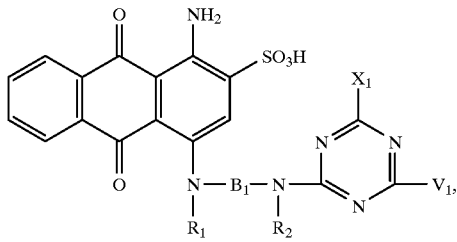

(1)

in which $R_1$ and $R_2$ independently of one another are hydrogen or substituted or unsubstituted $C_1$–$C_{12}$alkyl, $X_1$ is halogen, $B_1$ is an organic bridge member and $V_1$ is a radical of the formula

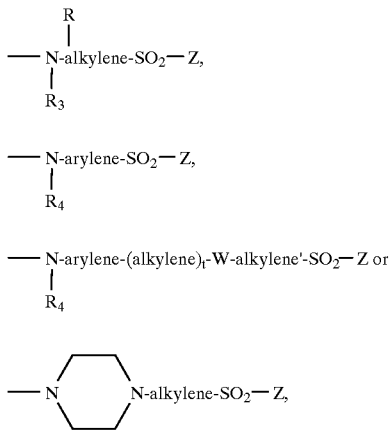

in which W is a group of the formula —$SO_2$—$NR_3$—, or —$CONR_3$— or —$NR_3CO$—, $R_3$ is hydrogen, $C_1$–$C_4$alkyl which is unsubstituted or substituted by hydroxyl, sulfo, sulfato, carboxyl or cyano, or a radical of the formula

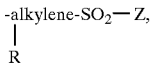

R is hydrogen, hydroxyl, sulfo, sulfato, carboxyl, cyano, halogen, $C_1$–$C_4$alkoxycarbonyl, $C_1$–$C_4$aklanoyloxy, carbarnoyl or the group —$SO_2$—Z, Z is the radical —CH=$CH_2$ or —$CH_2$—$CH_2$—Y and Y is a leaving group, aklylene and aklylene' independently of one another are $C_1$–$C_6$alkylene, arylene is a phenylene or naphthylene radical which is unsubstituted or substituted by sulfo, carboxyl, $C_1$–$C_4$alkyl, $C_1$–$C_4$alkoxy or halogen, $R_4$ is hydrogen or $C_1$–$C_4$aklyl which is unsubstituted or substituted by carboxyl, cyano, hydroxyl, sulfo or sulfato and t is the number 0 or 1, together with at least one fibre-reactive sulfo group containing yellow- orange-dyeing dye selected from dyes of the formulae

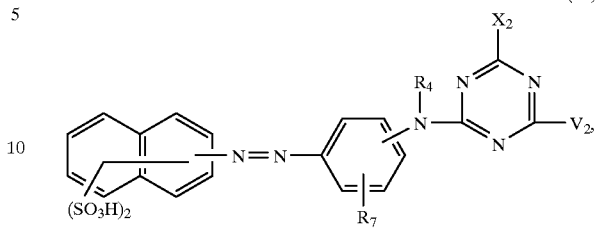

(14)

in which $R_7$ is hydrogen, $C_1$–$C_4$alkyl, $C_1$–$C_4$alkoxy, $C_2$–$C_4$aklanoylamino, ureido, sulfamoyl, halogen, sulfo or carboxyl, $X_2$ is fluorine or chlorine, $R_4$ is as defined above and $V_2$ is a radical of the formula

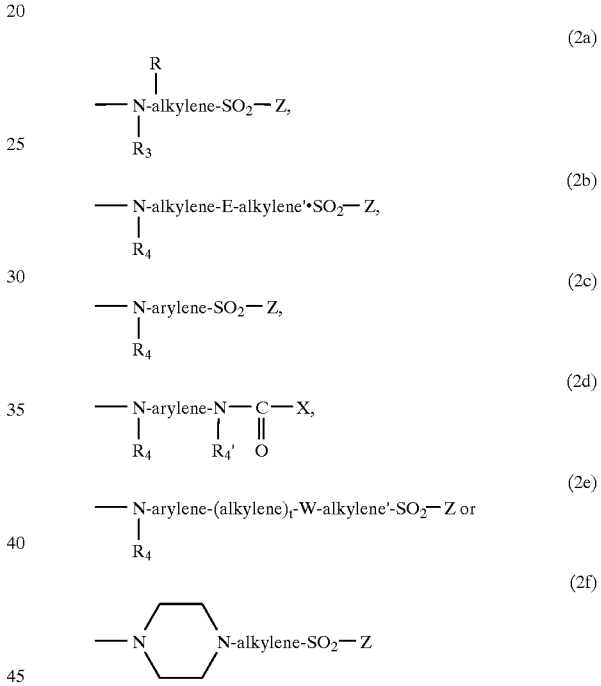

in which W, $R_3$, R, Z, t alkylene' and arylene are as defined above, E is the radical —O— or —$NR_5$— and $R_5$ is hydrogen or $C_1$–$C_4$alkyl, X is the radical

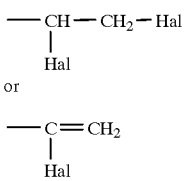

and Hal is halogen, and

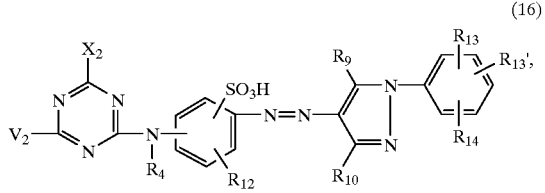
(16)

in which $R_9$ is hydroxyl or amino, $R_{10}$ is methyl or carboxyl, $R_{12}$, $R_{13}$, $R_{13}'$ and $R_{14}$ are as defined above for $R_7$ and $R_4$, $X_2$ and $V_2$ are defined above, and together with at least one fibre-reactive sulfo group containing red-dyeing dye of the formula

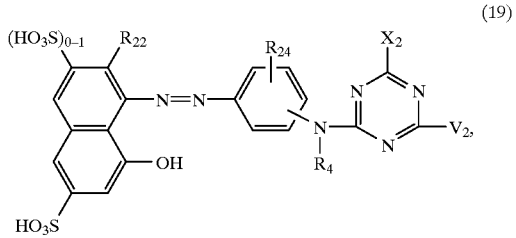
(19)

in which $R_{22}$ is amino or N-mono- or N,N-di-$C_1$–$C_4$alkylamino, $R_{24}$ is as defined above for $R_7$ and $R_4$, $X_2$ and $V_2$ are as defined above.

2. A process according to claim 1, wherein $R_4$ is hydrogen or $C_1$–$C_4$alkyl and $V_2$ is a radical of the formula

(3a)

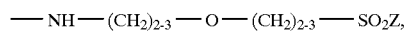
(3b)

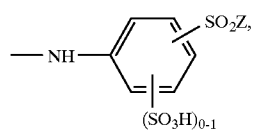
(3c)

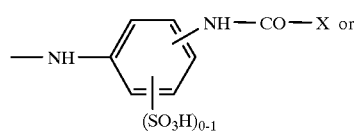
(3d)

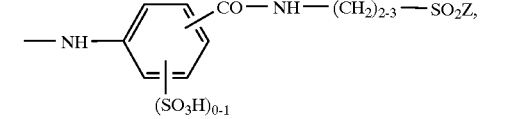
(3e)

in which X is the radical

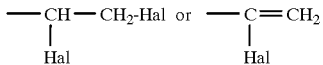

and Hal is bromine or chlorine, and Z is the radical —CH=CH$_2$ or —CH$_2$—CH$_2$—Y and Y is —Cl, —OSO$_3$H or —OCO—CH$_3$.

3. A process according to claim 1, wherein $R_1$ and $R_2$ independently of one another are hydrogen or $C_1$–$C_4$alkyl which is unsubstituted or substituted by hydroxyl, sulfo or sulfato.

4. A process according to claim 1, wherein $B_1$ is a $C_2$–$C_{12}$alkylene radical which is uninterrupted or is interrupted by 1, 2 or 3 members selected from the group consisting of —NH—, —N(CH$_3$)— or —O— and is unsubstituted or substituted by hydroxyl, sulfo, sulfato, cyano or carboxyl, or a $C_5$–$C_9$cycloalkylene radical, $C_1$–$C_4$alkylene—$C_5$–$C_9$cycloalkylene radical or $C_1$–$C_4$alkylene-$C_5$–$C_9$cycloalkylene—$C_1$–$C_4$alkylene radical, which are unsubstituted or substituted by $C_1$–$C_4$alkyl, $C_1$–$C_4$alkoxy, sulfo, halogen or carboxyl, or a phenylene radical, $C_1$–$C_4$alkylene-phenylene radical or $C_1$–$C_4$alkylene-phenylene-$C_1$–$C_4$alkylene radical, which are unsubstituted or substituted by $C_1$–$C_4$alkyl, $C_1$–$C_4$alkoxy, $C_2$–$C_4$alkanoylamino, sulfo, halogen or carboxyl.

5. A process according to claim 1, wherein $B_1$ is a $C_2$–$C_6$alkylene radical which is uninterrupted or is interrupted by 1, 2 or 3 members —O— and is unsubstituted or substituted by hydroxyl or sulfato, or a cyclohexylene radical or methylene-cyclohexylene radical which are unsubstituted or substituted by $C_1$–$C_4$alkyl, or a phenylene or methylene-phenylene-methylene radical which are unsubstituted or substituted by $C_1$–$C_4$alkyl, $C_1$–$C_4$alkoxy, halogen or sulfo.

6. A process according to claim 1, wherein $X_1$ is fluorine or chlorine.

7. A process according to claim 1, wherein W is a group of the formula —CONH—, $R_1$, $R_3$, $R_4$ and $R_4'$ are hydrogen, Y is —Cl, —OSO$_3$H or —OCO—CH$_3$, arylene is a phenylene radical which is unsubstituted or substituted by sulfo, carboxyl, $C_1$–$C_4$alkyl, $C_1$–$C_4$alkoxy or halogen, and t is the number 0.

\* \* \* \* \*